United States Patent [19]

Kim et al.

[11] Patent Number: 4,832,437
[45] Date of Patent: May 23, 1989

[54] FIBER OPTIC INTER-MODE COUPLING SINGLE SIDE BAND FREQUENCY SHIFTER

[75] Inventors: Byoung Y. Kim, Menlo Park; Herbert J. Shaw, Stanford, both of Calif.; Helege E. Engan, Trondheim, Norway; James N. Blake, Mountain View, Calif.

[73] Assignee: The Board of Trustees of the Leland Stanford Junior University, Stanford, Calif.

[21] Appl. No.: 48,142

[22] Filed: May 11, 1987

Related U.S. Application Data

[63] Continuation-in-part of Ser. No. 820,513, Jan. 17, 1986, abandoned, and Ser. No. 909,503, Sep. 19, 1986, abandoned, which is a continuation-in-part of Ser. No. 820,513.

[51] Int. Cl.[4] ........................... G02B 6/26; G02B 6/02
[52] U.S. Cl. ............................... 350/96.15; 350/96.29
[58] Field of Search ............... 350/96.15, 96.29, 96.30; 250/227

[56] References Cited

U.S. PATENT DOCUMENTS

| | | | |
|---|---|---|---|
| 3,406,358 | 10/1968 | Seidel et al. | 350/96.29 |
| 3,625,589 | 12/1971 | Snitzer | 350/149 |
| 3,645,603 | 2/1972 | Smith | 350/149 |
| 3,931,518 | 1/1976 | Miller | 350/96.15 |
| 3,936,144 | 2/1976 | Caton | 350/96.15 |
| 4,067,643 | 1/1978 | Sugimura et al. | 350/96.15 |
| 4,086,484 | 4/1978 | Steensma | 250/199 |
| 4,236,786 | 12/1980 | Keck | 350/96.15 |
| 4,312,562 | 1/1982 | Segawa et al. | 350/96.15 |
| 4,319,186 | 3/1982 | Kingsley | 350/96.29 |
| 4,684,215 | 8/1987 | Shaw et al. | 350/96.29 |
| 4,729,620 | 3/1988 | Pavlath | 350/96.15 |
| 4,735,484 | 4/1988 | Fesler | 350/96.29 |
| 4,735,485 | 4/1988 | Shaw et al. | 350/96.29 |

FOREIGN PATENT DOCUMENTS

153124 8/1985 European Pat. Off. .
57-158616 9/1982 Japan .

OTHER PUBLICATIONS

Taylor et al., "Acousto-Optic Phase Modulator Single Mode Optical Fiber", Navy Technical Disclosure Bulletin, vol. 11, No. 2, Dec. 1985, pp. 65–70.
Kino et al., "Acoustic Modulators for Optical Fibres", Revue de Physique Appliquee, vol. 20., No. 6, Paris, France, Jun. 1985, pp. 333–340.
R. N. Thurston, "Elastic waves in rods and clad rods", J. Acous. Soc. America, 64(1), Jul. 1978, pp. 1–37.
Lardat et al., "Applications of Edge-Bonded Transducers to SAW Components", Proceedings of the IEEE, vol. 64, No. 5, May 1976, pp. 627–630.
D. Bancroft, "The Velocity of Longitudinal Waves in Cylindrical Bars", Physical Review, vol. 59, Apr. 1, 1941, pp. 588–593.
H. McSkimin, "Propagation of Longitudinal Waves and Shear Waves in Cylindrical Rods at High Frequencies", J. Acoustical Soc. of America, vol. 28, No. 3, May 1956, pp. 484–494.

(List continued on next page.)

Primary Examiner—William L. Sikes
Assistant Examiner—Akm E. Ullah
Attorney, Agent, or Firm—Knobbe, Martens, Olson & Bear

[57] ABSTRACT

An optical fiber is subjected to a series of traveling flexural waves propagating along a length of the fiber. At least a portion of an optical signal propagating within the optical fiber in a first propagation mode is coupled to a second propagation mode. The optical signal in the second propagation mode has a frequency which is equal to either the sum of or the difference between the frequency of the optical signal in the first propagation mode and the frequency of the traveling flexural waves. The frequency of the optical signal in the second propagation mode is shifted upward or downward from the frequency of the optical signal in the first propagation mode as determined by the direction of propagation of the first optical signal with respect to the direction of propagation of the traveling flexural waves, and as also determined by whether the phase propagation velocity of the optical signal in the first propagation mode is greater than or less than the propagation velocity of the optical signal in the second propagation mode.

61 Claims, 14 Drawing Sheets

OTHER PUBLICATIONS

L. Pochhammer, "Ueber die Fortpflanzungsgeschwindigkeiten Kleiner Schwingungen in Einem Unbegrenzten Isotropen Kreiscylinder", Journal Fur Reine Und Angewandte Mathematik, vol. 81 (1876), pp. 324–326.

Meeker et al., "Guided Wave Propagation in Elongated Cylinders and Plates", Physical Acoustics-Principles and Methods, vol. 1A, W. P. Mason, Editor, Academic Press, New York, 1964, pp. 111–167.

R. Davies, "A Critical Study of the Hopkinson Pressure Bar", Philosophical Transactions of the Royal Society of London, vol. 240, Jan. 8, 1948, pp. 375–457.

Martin Redwood, Mechanical Waveguides, Pergamon Press, 1960, pp. 135–173.

Cook et al., "Surface Waves at Ultrasonic Frequencies", *ASTM Bulletin*, May 1954, pp. 81–84.

Gfeller, "Electroacoustic Transducers for Optical Fiber Modulator and Tap", *IBM Technical Disclosure Bulletin*, vol. 21, No. 2, Jul. 1978, pp. 813–814.

Gfeller et al., "Modulator and Tap for Optical Fiber Systems", *IBM Technical Disclosure Bulletin*, vol. 21, No. 5, Oct. 1978, pp. 2014–2015.

Layton et al., "Optical Fiber Acoustic Sensor Utilizing Mode-Mode Interference", *Applied Optics*, vol. 18, No. 5, Mar. 1, 1979, pp. 666–670.

Ulrich et al., "Single-mode fiber-optical polarization rotator", *Applied Optics*, vol. 18, No. 11, Jun. 1, 1979, pp. 1857–1861.

Heismann et al., "Integrated-Optical Single-Sideband Modulator and Phase Shifter", *IEEE J. of Quantum Electronics*, vol. QE-18, No. 4, 4/82, pp. 767–771.

Kitayami et al., "Stress-induced frequency tuning for . . . single-mode fiber", *Applied Physics Letters*, vol. 41, No. 4, Aug. 1982, pp. 322–324.

Wong et al., "Electro-optic-waveguide frequency translator . . . exchange", *Optics Letters*, vol. 7, No. 11, Nov. 1982, pp. 546–548. (1982).

Onashi et al., "phase-matching light amplification by three-wave . . . stress", *Applied Physics Letters*, vol. 41, No. 12, Dec. 15, 1982, pp. 1111–1113.

Kingston et al., "Broadband guided-wave optical frequency translator . . . array", *Applied Physics Letters*, vol. 42, No. 9, May 1, 1983, pp. 759–761.

Nosu et al., "Acousto-optic Frequency Shifter for Single Mode Fibers", published at the 47th Int'l. Conf. on Integrated Optics . . . in Tokyo, Jun. 1983, Paper 29C5-3.

Nosu et al., "Acousto-optic Phase Modulator for Single Mode Fibers", published at the 47th Int'l. Conf. on Integrated Optics . . . in Tokyo, Jun. 1983, Paper 28C3-5.

Nosu et al., "Acousto-Optic Frequency Shifter for Single-Mode Fibers", *Electronic Letters*, vol. 19, No. 22, Sep. 29, 1985, pp. 816–818.

Youngquist et al., "Birefringent Fiber Polarization Coupler", *Optics Letters*, vol. 8, No. 12, Dec. 1983, pp. 656–658.

Risk et al., "Single-sideband frequency shifting in birefringent optical fiber", SPIE, Fiber Optic and Laser Sensors II, vol. 478, 1984, pp. 91–97.

Risk et al., "Acousto-Optic Birefringent Fiber Frequency Shifters", Integrated and Guided Wave Optics Conference, Kissimmee, Florida (4/84).

Youngquist et al., "Two-Mode Fiber Modal Coupler", *Optics Letters*, vol. 9, No. 6, Jun. 1984, pp. 249–251.

Brooks et al., "Active Polarization Coupler for Birefringent Fiber", *Optics Letters*, vol. 9, No. 6, Jun. 1984, pp. 249–251.

Youngquist, "Single Sideband Frequency Shifting", Ph.D. Thesis: Loss and Periodic . . . Couplers, Chapter 7, Stanford University, Jun. 1984, pp. 79–88.

Risk et al., "Acousto-optic frequency shifting in birefringent fiber", *Optics Letters*, vol. 9, No. 7, Jul. 1984, pp. 309–311.

Heismann et al., "Integrated-optical frequency translator with stripe waveguide", *Applied Physics Letters*, vol. 45, No. 5, Sep. 1, 1984, pp. 490–492.

Taylor, "Bending Effects in Optical Fibers", *J. of Lightwave Technology*, vol. LT-2, No. 5, Oct. 1984, pp. 617–628.

Risk et al., "Acoustic Fiber-Optic Modulators", Proceedings of the IEEE Ultrasonics Symposium, Nov. 14–16, 1984, pp. 318–327.

Johnson, L. M., "Integrated Optical Components for Fiber Gyroscopes", SPIE's 29th Annual Int'l. Tech. Symposium . . . San Diego, 1985, Paper 566-14.

Youngquist et al., "All-fibre components using periodic coupling", IEEE Proceedings, vol. 132, Pt. J. No. 5, Oct. 1985, pp. 277–286.

Kim et al., "All-fiber acousto-optic frequency shifter", *Optics Letters*, vol. 11, No. 6, Jun. 1986, pp. 389–391.

Sorin et al., "Highly selective evanescent modal filter for two-mode optical fibers", *Optics Letters*, vol. 11, No. 9, Sep. 1986, pp. 581–583.

Baer et al., "Conical transducer for generation of acoustic waves in fluids", *Applied Physics Letters*, vol. 42, No. 7, Apr. 1, 1983, pp. 573–574.

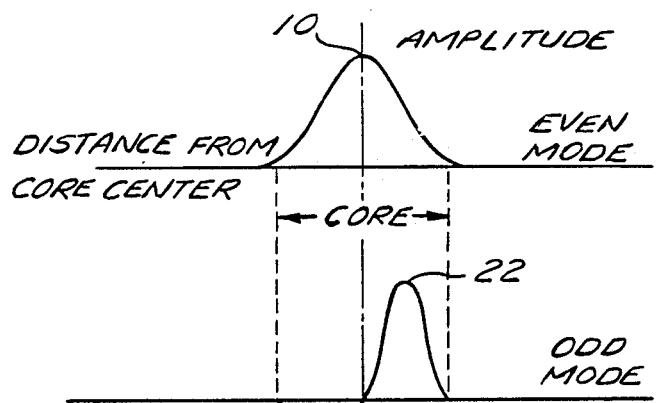
Fig. 1a
Fig. 1b
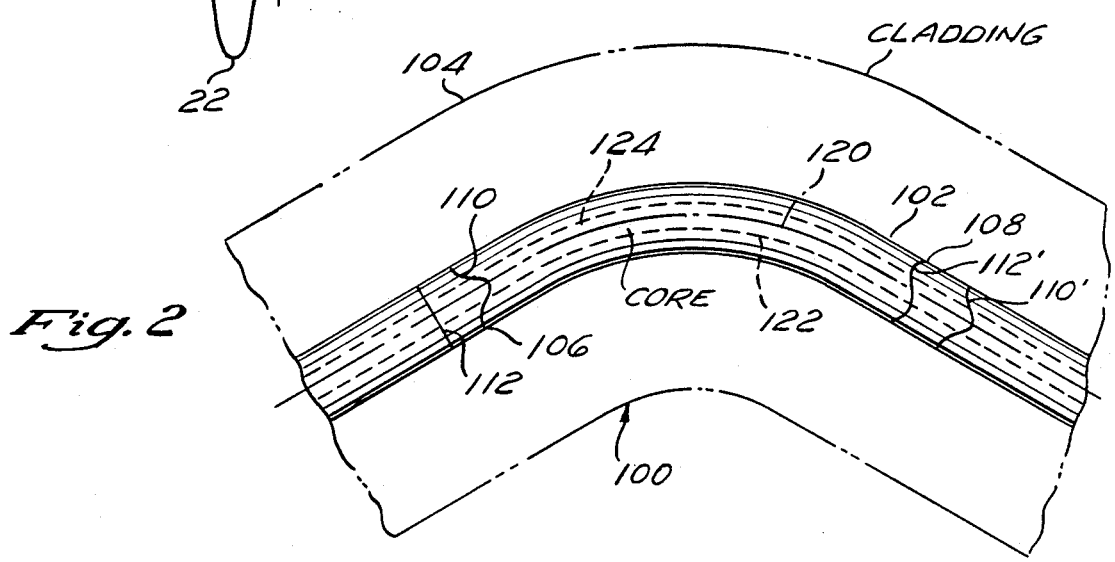
Fig. 2
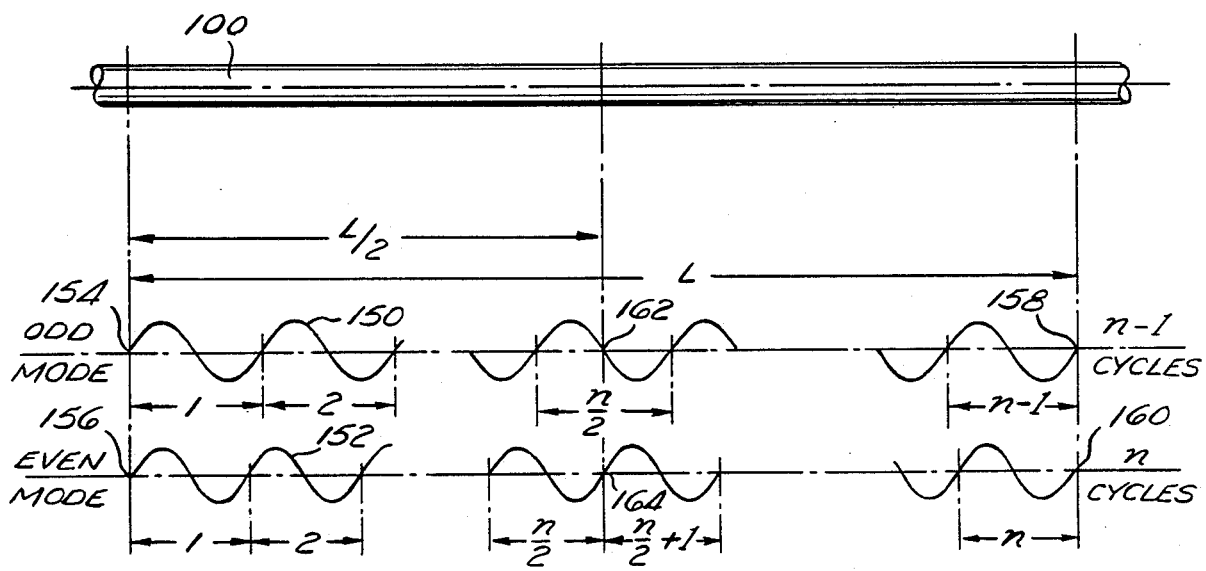
Fig. 3

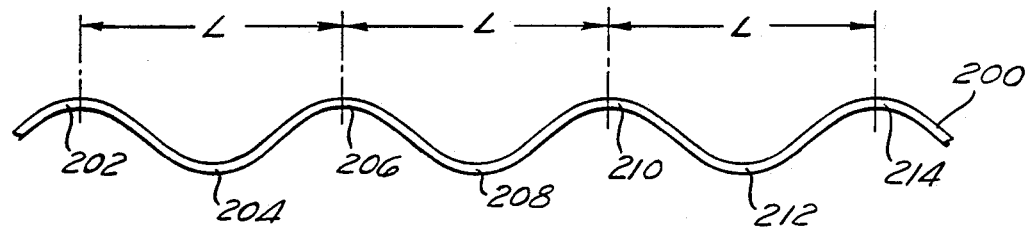
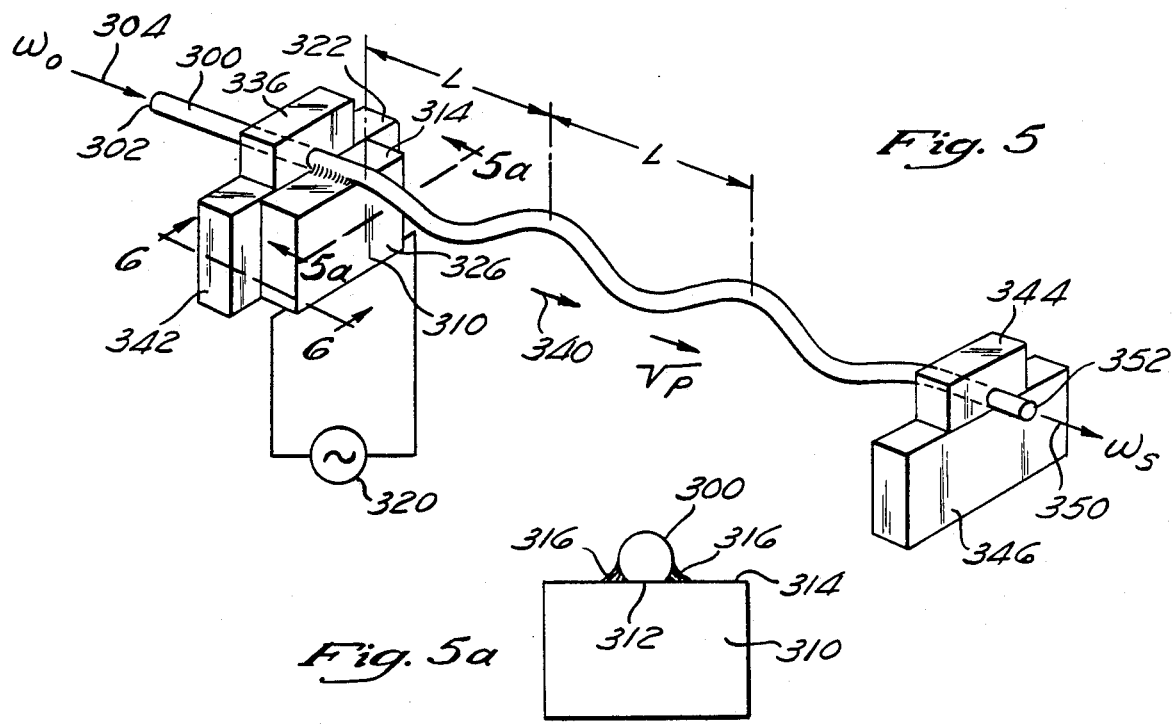
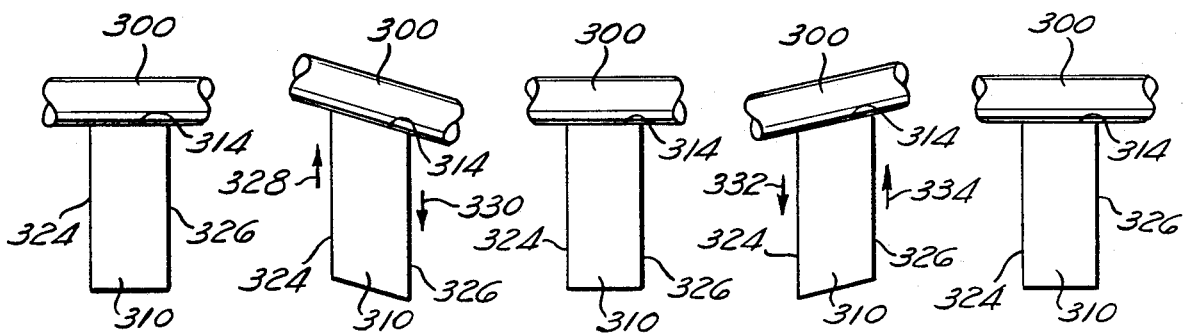

WITHOUT ACOUSTIC SIGNAL | WITH ACOUSTIC SIGNAL

ACOUSTIC WAVE @ 7.93 MHz | ACOUSTIC WAVE OFF | ACOUSTIC WAVE @ 7.73 MHz

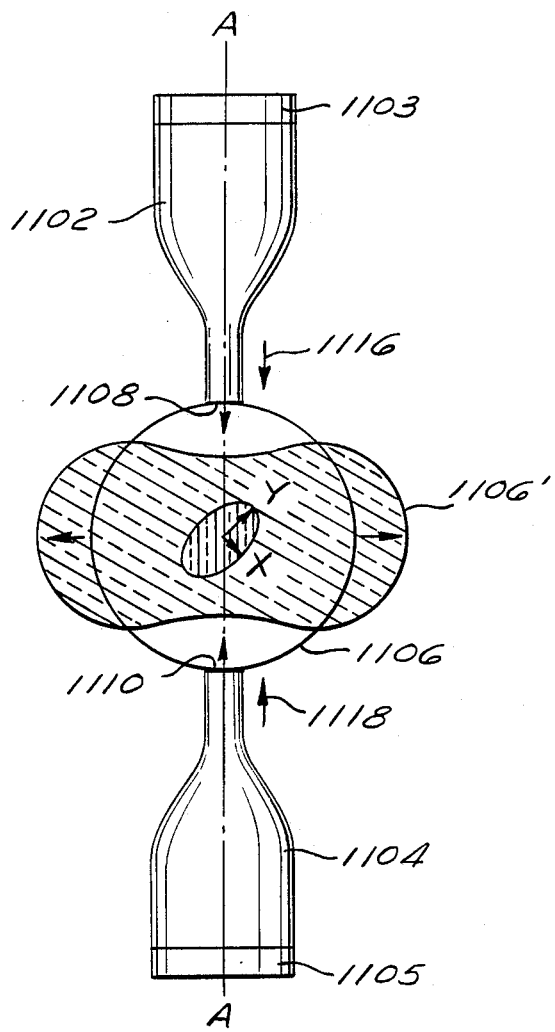
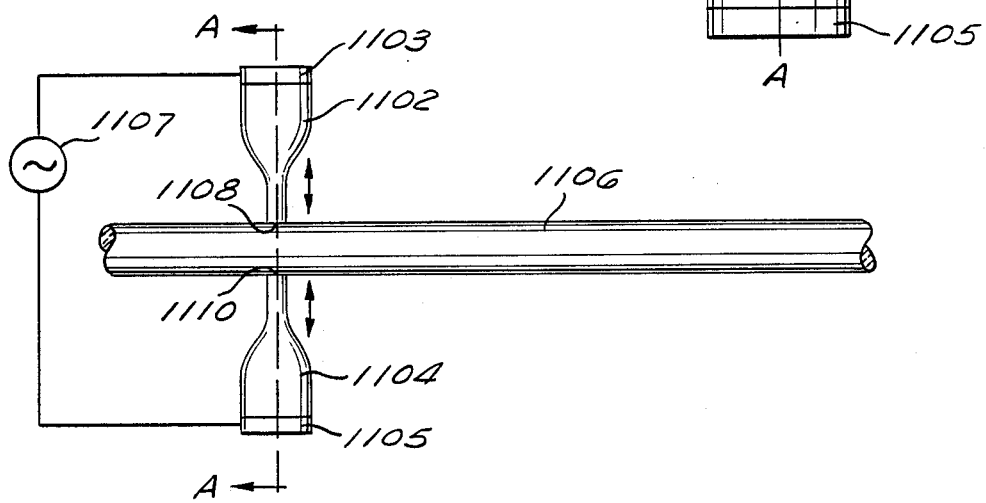
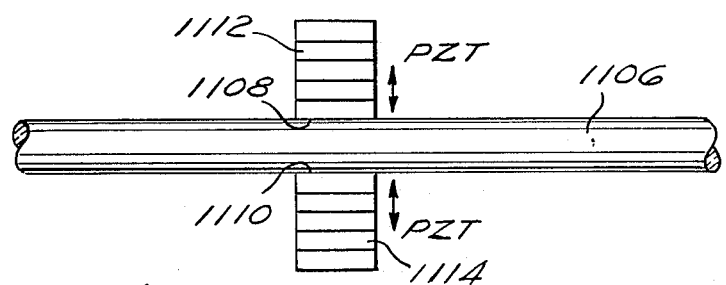

FIBER OPTIC INTER-MODE COUPLING SINGLE SIDE BAND FREQUENCY SHIFTER

RELATED APPLICATIONS

This application is a continuation-in-part of U.S. patent application Ser. No. 820,513, filed on Jan. 17, 1986 now abandoned, and is also a continuation-in-part of U.S. patent application Ser. No. 909,503 now abandoned, filed on Sept. 19, 1986, which is a continuation-in-part of U.S. patent application Ser. No. 820,513, filed on Jan. 17, 1986. Both prior Applications are assigned to the assignee of this application.

FIELD OF THE INVENTION

The present invention relates generally to fiber optic devices and, more specifically, to devices which couple light energy from an optical signal input into an optical fiber in one mode at one frequency to a different mode at a shifted frequency.

BACKGROUND OF THE INVENTION

Fiber optic frequency shifters are useful devices for a variety of fiber optic sensor and signal processing applications, such as in fiber optic gyros and the like. It has been shown, for example in copending U.S. patent application Ser. No. 556,636 now U.S. Pat. No. 4,684,215, "Single Mode Fiber Optic Single Side Band Modulator", filed on Nov. 30, 1983, and assigned to the assignee of the present application, that light launched in one propagation mode of a fiber can be coupled to another propagation mode and shifted in frequency by propagating an acoustic wave along the length of the fiber to cause a periodic stress of the fiber. The light is shifted in frequency by an amount equal to the frequency of the acoustic wave. The copending U.S. patent application Ser. No. 556,636 U.S. Pat. No. 4,684,215 is incorporated herein by reference.

As set forth in the above-referenced copending application, if the acoustic wave propagates along the fiber in the same direction as an optical signal propagates through the fiber, light traveling in a first propagation mode in the fiber at a first phase velocity and at a first frequency is coupled to a second propagation mode at a second phase velocity higher than the first phase velocity and is shifted downward in frequency. Similarly, if the light is originally propagating in the fiber in a faster propagation mode, the light is coupled to a slower propagation mode at a higher frequency. On the other hand, if the acoustic wave propagates along the fiber in a direction opposite the direction that an optical signal is propagating through the fiber, light traveling in a slower propagation mode is coupled to a faster propagation mode and is shifted upward in frequency. Similarly, light traveling in a faster propagation mode opposite the direction of propagation of an acoustic wave is coupled to a slower propagation mode and is shifted downward in frequency.

For optimal coupling to occur in the frequency shifter described in the above-referenced copending application, the acoustic wavelengths in the direction of propagation of the optical signal through the fiber should be substantially equal to the beat length of an optical signal traveling through the fiber. As is well known, when light travels through a fiber in more than one propagation mode, the light travels through the fiber at a different phase velocity for each of the different propagation modes. Light traveling in the slower propagation mode travels at a lower phase velocity than light in a faster propagation mode. Thus, a light signal having a fixed frequency will have a longer wavelength in the faster propagation mode than it has in the slower propagation mode. As the light propagates down the length of the fiber, a phase difference will thus develop between the light in the two modes. At spatially periodic distances, the light in the two modes will be in phase. The distance between successive locations where the light is in phase is referred to as the beat length of the fiber for the two modes at a specified frequency.

For the devices discussed in the above-mentioned co-pending application, this is the beat length that must match the acoustic wavelength in order to achieve optical coupling of energy, between the modes. The light propagating along a fiber in one propagation mode is converted to light propagating in a second propagation mode by applying a periodic, traveling wave, compressive force along a segment of the length of the fibers. A more complete description of this technique is found in "Single-Sideband Frequency Shifting in Birefringent Optical Fiber", W. P. Risk, et al *SPIE Volume 478—Fiber Optic and Laser Sensors II* (1984), pp. 91–97, which is incorporated herein by reference.

SUMMARY OF THE INVENTION

The present invention is an improvement over known methods of shifting the frequency of an optical signal propagating in an optical fiber. The present invention provides for more efficient utilization of the energy input into the fiber to cause the coupling. The present invention also has a broader optical bandwidth and is thus usable over a broader range of frequencies.

The present invention comprises an optical fiber which has first and second optical propagation modes for optical signals propagating in the fiber. An acoustic wave generator is connected to the fiber which generates a flexural acoustic wave that propagates in the fiber, such that the energy of the flexural wave is confined to the fiber. The wavelength of the flexural wave in the fiber is determined by its propagation velocity and frequency. This wavelength is selected to cause light propagating in one of the modes of the fiber to be coupled to another propagation mode of the fiber.

One preferred embodiment of the present invention comprises a multimode optical fiber which has two spatial modes of propagation. An optical signal is introduced into the fiber in one of the two propagation modes. A source of modulation energy is applied to a segment of the fiber to periodically form microbends in the fiber so as to induce a first order group flexural wave that propagates along the length of the fiber in the form of traveling microbends having a microbend propagation velocity. The propagation velocity and the frequency of the microbend wave are selected to provide a microbend propagation constant which is substantially equal to the difference in the propagation constants of the two propagation modes for the optical signal traveling within the fiber. Thus, the propagation wavelength of the traveling microbend wave is substantially equal to the beat length between the two propagation modes of the optical signal within the fiber. The additive effect of the microbends comprising the microbend wave causes an optical signal input into the optical fiber at a first frequency in one of the two propagation modes to be coupled to an optical signal in the other of the two propagation modes at a second frequency which is either the sum of or the difference between the first frequency and the frequency of the traveling microbend wave.

In a preferred embodiment, the optical signal is input into the optical fiber in the first order $LP_{01}$ propagation mode at a first phase velocity. When the periodic microbend wave is propagating along the length of the fiber in the same direction as the optical signal is propagating in the fiber, the optical energy in the first order $LP_{01}$ mode is coupled to a higher order mode (e.g., the $LP_{11}$ mode) at a higher phase velocity and is shifted downward in frequency from the first frequency to a second frequency which is lower than the first frequency. The second frequency is equal to the difference between the first frequency and the frequency of the periodic microbend wave. When the optical energy is input into the fiber in the second order $LP_{11}$ mode and propagates in the same direction as the propagation of the periodic microbend wave, optical energy is coupled from the second order $LP_{11}$ mode to the first order $LP_{01}$ mode with a shift upward in frequency to a second frequency and a corresponding decrease in phase velocity The second frequency in this case is equal to the sum of the first frequency and the frequency of the periodic microbend wave.

On the other hand, if the optical energy is input into the fiber and propagates in the opposite direction as the direction of propagation of the periodic microbend wave, optical energy input into the higher order $LP_{11}$ mode at a first frequency is coupled to the first order $LP_{01}$ mode at a second frequency lower than the first frequency and the phase velocity decreases. The second frequency is equal to the first frequency minus the frequency of the traveling periodic microbend wave. Similarly, optical energy input into the fiber at a first frequency in the first order $LP_{01}$ mode and propagated in a direction opposite the direction of propagation of the traveling microbend wave is coupled from the first order $LP_{01}$ mode to the second order $LP_{11}$ mode and is shifted upward in frequency from the first frequency to a second frequency equal to the sum of the first frequency and the frequency of the periodic microbending and the phase velocity is increased.

The present invention is particularly advantageous in that it perates over a broad range of optical frequencies and over a broad range of modulation frequencies. The broad range of optical frequencies results from the coupling of optical energy between spatial propagation modes. The beat length of two spatial propagation modes for an optical signal does not vary significantly over a relatively large frequency range. The broad range of modulation frequencies results from the fact that the modulation energy is concentrated in the traveling microbend wave in the fiber and thus a large amount of energy is available to effectuate coupling from one spatial propagation mode to the other spatial propagation mode in a relatively few number of beat lengths. Thus, the modulation wavelength can deviate by a relatively large percentage from the wavelength corresponding to the beat length without causing a large accumulation of phase error between the optical beat lengths and the traveling microbend wave. The combined effect of the large absolute frequency of modulation corresponding to the beat length of the optical signal propagation modes and the acceptable deviation from the frequency provides a relatively broad absolute range of modulation frequencies.

No compressive forces are required to cause the coupling of light between the two propagation modes. Thus, no error is introduced into the optical signals by static coupling which can cause an output signal in the coupled propagation mode in the absence of a modulation signal.

The periodic microbending is introduced into the fiber by a transducer which is bonded to a portion of the fiber. The transducer is caused to vibrate at a frequency which is selected to generate a series of periodic microbends having a propagation constant substantially equal to the difference in the propagation constants of the two propagation modes in the optical fiber. In one preferred embodiment, the transducer is an acoustic transducer which is coupled to the optical fiber via a fused quartz rod. The fused quartz rod has a first end which has substantially the same diameter as the optical fiber and which is fused to only one side of the optical fiber. The quartz rod has a second end which is substantially larger than the first end and which has an piezoelectric acoustic transducer bonded to it. When an electrical signal is applied to the piezoelectric transducer, an acoustic wave propagates from the second end of the quartz rod to the first end and thus causes a vibration to be induced in the optical fiber. The vibration propagates away from the first end of the quartz rod as a series of periodic microbends in the optical fiber.

A preferred embodiment of the present invention comprises a birefringent single-mode optical fiber which propagates light in two orthogonal polarization modes. An optical signal is introduced into one of the two polarization modes of the fiber for propagation within the fiber. An acoustic wave generator applies a periodic lateral squeezing force to the fiber, thus causing a second order flexural wave to propagate within the fiber. The wavelength of the second order flexural wave is selected to cause light propagating in one polarization mode to be coupled to the orthogonal polarization mode. Preferably, the lateral squeezing force is oriented at an angle of substantially 45° with respect to the axes of birefringence of the fiber.

The propagation velocity of the acoustic wave along the length of the fiber is dependent upon the cross-sectional dimensions of the optical fiber. Thus, the wavelength of an acoustic wave is dependent upon the cross-sectional dimensions of the fiber as well as dependent upon the acoustic frequency. In alternative embodiments of the present invention, the optical fiber in the frequency shifter has cross-sectional dimensions that vary along the length of the fiber. The fiber thus provides a plurality of different locations wherein the frequency of the acoustic wave having a wavelength that matches the optical beat length varies in accordance with the cross-sectional dimensions. This enables the acoustic frequency to be varied while providing a region on the fiber where substantial coupling occurs for each of the frequencies.

The cross-sectional dimensions of the optical fiber can advantageously be varied in discrete steps to provide a plurality of fiber portions that define coupling regions. A first portion preferably has a larger outer diameter than a second portion so that a traveling flexural wave at a first acoustic frequency has a first acoustic velocity in the first portion corresponding to an acoustic wavelength that matches the optical beat length in the fiber and so that a traveling flexural wave at a second frequency has substantially the same acoustic wavelength in the second portion of the fiber and thus also matches the optical beat length. An optical signal in the fiber can be selectively shifted in frequency by selecting the acoustic frequency of the traveling flexural waves.

The traveling flexural waves are preferably generated by an acoustic transducer. The acoustic transducer is preferably an elongated member having a first small end mechanically coupled to the optical fiber and a larger end having an electrically driven transducer, such as a piezoelectric transducer, disposed thereon. Application of an electrical signal to the electrically driven transducer generates an acoustic wave at the large end of the elongated member that propagates to the smaller end where it induces a flexural wave in the fiber. In preferred embodiments of the invention, the elongated member has a cavity proximate to the larger end to suppress propagation of bulk acoustic waves in the elongated member. The cavity can advantageously be filled with an acoustic damping material.

In preferred embodiments of the invention using multimode fiber, the optical fiber of the frequency shifter is a two-mode optical fiber having a core with an elliptical cross section such that the lobe orientations of one of the higher order propagation modes of the fiber is non-degenerate with the orthogonal lobe orientation of the same mode.

In one embodiment of a system incorporating the present invention, the system includes a first segment of a multimode optical fiber which receives light from a single-mode optical fiber. The light entering this first segment of multimode optical fiber is preferably propagating substantially entirely within the fundamental or first order $LP_{01}$ mode. The optical signal has a wavelength which will propagate through the multimode fiber in both the first and second order propagation modes. A mode stripper is preferably provided at the first segment of multimode fiber to suppress further propagation of any light energy which may be traveling in the second order $LP_{11}$ propagation mode. The mode stripper may be advantageously produced by forming a portion of the first segment of the multimode fiber into a coil sized to have a proper coil diameter to strip light propagating in the second order mode from the fiber without affecting the light propagating in the first order mode. Alternatively, the mode stripper may comprise one-half of a directional coupler. The light from the second order mode is stripped from the fiber by applying a liquid, having an appropriate index of refraction, to the exposed segment of fiber to cause the light traveling in the second order propagation mode to be lost from the fiber.

The light leaving the mode stripper, which contains only light traveling in the first order $LP_{01}$ propagation mode, then enters a second segment of the multimode optical fiber. The second multimode fiber segment is part of an inter-propagation mode, frequency shifter built in accordance with the present invention. Accordingly, a periodic, traveling microbend or first order flexural wave is induced in the second segment such that it propagates along the length of the second segment of the multimode fiber. The wavelength of the traveling microbend or flexural wave is matched to the beat length of the optical signal traveling in the fiber. The periodic, traveling microbend or flexural wave causes light energy in the first order $LP_{01}$ propagation mode to be coupled to the second order $LP_{11}$ propagation mode because of the periodically repeating series of bends which the wave causes in the multimode optical fiber. The traveling microbends also cause the light so coupled to be frequency shifted by an amount equal to the frequency of the periodic, traveling microbend or flexural wave.

After the frequency shifter, the second segment of the multimode optical fiber is connected to a fiber optic mode selector for multimode signals. The mode selector is configured to couple only that light which is propagating in the second order $LP_{11}$ propagation mode from the multimode fiber to an immediately adjacent single-mode fiber. Thus, the only light transmitted from the fiber optic mode selector is that light which has been coupled to the second order $LP_{11}$ propagation mode and shifted in frequency. The fiber optic mode selector is constructed in accordance with the description set forth in a copending U.S. patent application Ser. No. 820,411, entitled "Fiber Optic Mode Selector," filed on Jan. 17, 1986 and assigned to the assignee of the instant application. The copending application is incorporated herein by reference.

The present invention may be more fully understood from the following detailed description, taken in conjunction with the drawings.

BRIEF DESCRIPTION OF THE DRAWINGS

FIG. 1a is a graphical illustration of the electric field distribution for the $LP_{01}$ optical propagation mode.

FIG. 1b is a graphical representation of the electric field distribution for the $LP_{11}$ optical propagation mode.

FIG. 2 is a partial cross sectional view of a bend in an optical fiber pictorially illustrating the coupling effect from the $LP_{01}$ optical mode to the $LP_{11}$ optical mode.

FIG. 3 is a pictorial illustration of the phase relationships between the optical signals traveling in the two propagation modes.

FIG. 4 is a pictorial representation of an optical fiber formed into a series of static microbends.

FIG. 5 is a perspective illustration of the present invention showing an optical fiber and a transducer mechanically connected to the optical fiber to induce a series of traveling microbends in the optical fiber.

FIG. 5a is a cross sectional view taken along the lines 5a—5a in FIG. 5 showing the attachment of the optical fiber to the transducer.

FIGS. 6a-6e are partial elevational views showing the operation of the transducer to generate the traveling microbends in the optical fiber.

FIG. 26a illustrates an alternative embodiment of the present invention in which a second order flexural wave is induced in the fiber by two acoustic horns which apply a squeezing force to the fiber.

FIG. 26b illustrates an alternative embodiment of the present invention in which a second order flexural wave is induced in the fiber by two stacks of piezoelectric transducers (PZT) which apply a lateral squeezing force to the fiber.

FIG. 27 is a pictorial representation illustrating the spatial displacement of the cross-section of the fiber created by propagation of a second order flexural wave within the fiber.

DETAILED DESCRIPTION OF THE PREFERRED EMBODIMENTS

Figure 7A:
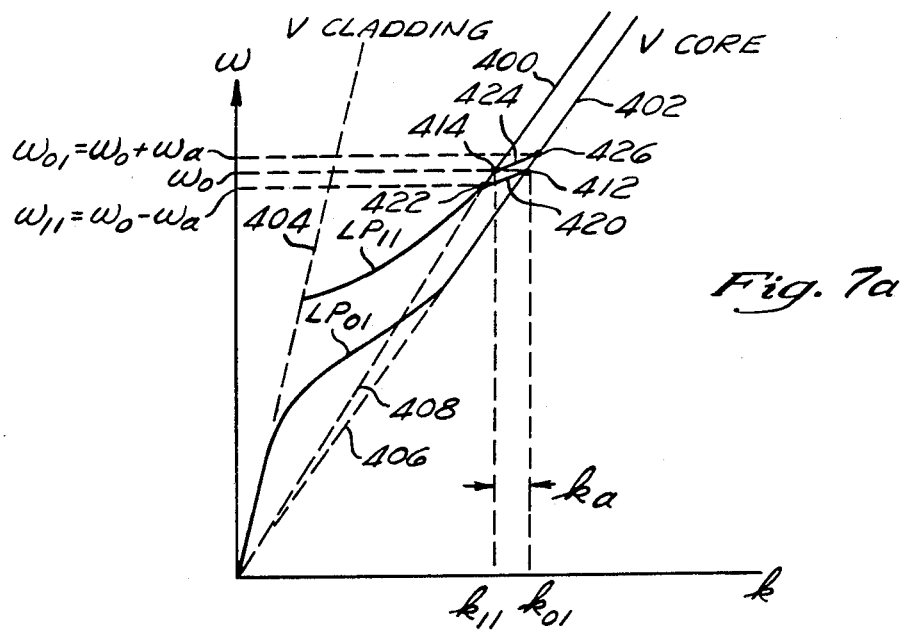
FIG. 7a is a graphical representation of the coupling between the propagation modes when the optical signal is traveling in the same direction as the direction of propagation of the traveling microbends.

A multimode fiber is a fiber which can support more than one spatial propagation mode for an optical signal. Typically, such fibers comprise an inner core of relatively large refractive index surrounded by an outer core of relatively low refractive index. As is well known in the art, the fundamental, first order $LP_{01}$ propagation mode, or even mode, has the slowest phase propagation velocity of the spatial propagation modes. FIG. 1a illustrates an amplitude diagram for the electric field distribution of the $LP_{01}$ mode with respect to the core of the optical fiber. The portion of an optical signal traveling in the $LP_{01}$ mode has its optical energy concentrated near the center of the core of the optical fiber as illustrated by the maximum 10 in the amplitude diagram in FIG. 1a. As the distance from the center of the core increases, the amplitude of the light decreases. In contrast to the lower order $LP_{01}$ mode, light traveling in the second order $LP_{11}$ mode or odd mode, has an electrical field amplitude distribution having two maxima 20 and 22 displaced away from the center of the core as illustrated FIG. 1b. As also illustrated in FIG. 1b, the amplitude of the optical energy in the fiber at diametrically opposed locations in the core are 180° ($\pi$ radians) out of phase with each other. In a substantially straight, unstressed optical fiber, the $LP_{01}$ mode and the $LP_{11}$ mode are considered to be orthogonal propagation modes such that light traveling in one of the modes is not ordinarily coupled to the other mode. This non-coupling condition is maintained so long as the amplitude distribution is symmetrical about the center of the core, as illustrated by the $LP_{01}$ mode in FIG. 1a, or substantially 180° out of phase about the center of the core, as illustrated by the odd mode in FIG. 1b. While these conditions are maintained, there is no overlap between the two modes and thus no coupling between the modes.

Since the first order $LP_{01}$ mode has its energy concentrated near the center of the core, substantially all of the optical energy travels in the core. In contrast, the second order, $LP_{11}$ mode has a substantially larger portion of its energy distributed near the cladding. Since the cladding has a lower refractive index than the core, the phase velocity of the second order $LP_{11}$ mode is higher than the phase velocity of the first order $LP_{01}$ mode.

It has been found that if a fiber 100, having a core 102 and a cladding 104, is bent, as illustrated in cross section in FIG. 2, a portion of the optical energy entering the bent portion of the fiber in one mode (e.g., the first order $LP_{01}$ mode) is coupled to the orthogonal mode (e.g., the second order $LP_{11}$ mode) as the optical energy propagates through the bent portion of the fiber 100. One explanation for this effect is that the optical energy traveling through the core 102 of the fiber 100 on the inside of the bend has a shorter path than the light traveling on the outside of the bend. Referring to FIG. 2, location 106 designates the beginning of the bent portio of the fiber 100. Location 108 designates the end of the bent portion of the fiber 100. An electric field amplitude distribution curve 110 is superimposed upon the cross section of the fiber 100 at the location 106 and illustrates that the optical energy is in the $LP_{01}$ mode (i.e., the electric field amplitude distribution is symmetrical about the center of the fiber). A second optical amplitude curve 112 illustrates the amplitude of the optical energy in the $LP_{11}$ mode. In this example, it will be assumed that there is no light in the second order $LP_{11}$ mode at the location 106, and thus, the electric field distribution amplitude curve 112 is shown as having zero magnitude. Thus, all of the optical energy is concentrated in the $LP_{01}$ mode at the location 106 of the fiber 100.

In the straight portion of the optical fiber before the location 106, the $LP_{01}$ and $LP_{11}$ modes are orthogonal and no coupling occurs. As the optical signal travels from the location 106 to the location 108, a portion of the optical signal traveling along the center of the core, illustrated in phantom lines by a path 120. A portion of the optical signal also travels along an inner path 122, illustrated in dashed lines, which has a shorter radius than the path 120 in the center of the fiber core and thus has a shorter path length. Additionally, a portion of the optical signal travels along a path 124, also illustrated by dashed lines, which has a larger radius than the path 120 and thus has a longer path length. Thus, an optical signal traveling along the path 122 or any other path having a radius smaller than the radius of the center of the core will travel a shorter distance from the location 106 to the location 108 than an optical signal traveling along the path 124 or any other path having a radius greater than the radius of the path 120. Because of the difference in the lengths of the paths from the location 106 to the location 108, the optical signal which was in phase across a cross-section of the fiber 100 at the location 106, is no longer in phase when it reaches the location 108. Thus, the amplitude distribution of the optical signal at the location 108 does not correspond to the symmetrical distribution shown in FIG. 1a. Therefore, the optical signal is no longer entirely orthogonal to the $LP_{11}$ mode, and a portion of the optical signal is coupled to the $LP_{11}$ mode. As illustrated in FIG. 2, at location 108 the amplitude of the signal in the $LP_{01}$ mode, depicted by a curve 110' has been reduced in amplitude. Furthermore, a curve 112', representing the optical amplitude in the $LP_{11}$ mode, no longer has a zero magnitude. Thus, a portion of the optical energy is transferred from the $LP_{01}$ mode to the $LP_{11}$ mode. The fraction of energy transferred from the $LP_{01}$ mode to the $LP_{11}$ mode depends upon the radius of the bend of the fiber core 102 and upontthe length of the fiber core 102 which is so bent. The foregoing effect is reciprocal in that light energy input into the fiber such that it is traveling in the $LP_{11}$ mode is coupled to the $LP_{01}$ mode.

When an optical signal is traveling in the core 102 of the fiber 100 in two different propagation modes, light traveling in the first order $LP_{01}$ mode travels at a slower phase propagation velocity than light traveling in the second order $LP_{11}$ mode. Thus, if the light in the two modes is from the same source and has the same frequency, light traveling a distance L in the first order $LP_{01}$ mode will take more time to travel the distance L than the light traveling the same distance in the second order $LP_{11}$ mode. Thus, the phase of the light in the $LP_{01}$ mode will lag the phase of the light in the $LP_{11}$ mode through the distance L. This is pictorially illustrated in FIG. 3. The light traveling in the $LP_{11}$ mode is represented as a series of waves 150 and the light traveling in the $LP_{01}$ mode is represented as a series of waves 152. The length L is selected such that if an optical wavefront traveling in the $LP_{01}$ mode completes exactly n cycles in traveling the distance L, the light traveling in the $LP_{11}$ mode will complete exactly $n-1$ cycles. This is illustrated in FIG. 3. Thus, when the light in the $LP_{11}$ mode is exactly in phase with the light in the $LP_{01}$ mode at the beginning of the distance L, designated as the locations 154 and 156 on the curves 150 and 152, respectively, the light will also be in phase at the end of a distance L, illustrated as locations 158 and 160 on the curves 150 and 152, respectively. Similarly, when the light has traveled a distance of $L/2$, the light in the $LP_{11}$ mode is 180° ($\pi$ radians) out of phase with the light in the $LP_{01}$ mode, as illustrated by the locations 162 and 164 on the curves 150 and 152, respectively. The distance L is referred to as the beat length of the fiber 100 for the two propagation modes at a selected frequency. The distance L is calculated as $$L = \frac{2\pi}{\Delta k} \qquad (1)$$

where $\Delta k$ is the difference in the propagation constants of the two modes along the fiber. As is well known, the propagation constant, k, is $2\pi$ times the number of cycles of a signal in a unit length and is calculated as follows:

$$k = \frac{2\pi}{\lambda} \qquad (2)$$

where $\lambda$ is the wave length in the medium in which the signal is propagating. As set forth above, a signal propagating in the first order $LP_{01}$ mode propagates at a lower velocity and thus has more cycles per unit length than the second order or $LP_{11}$ mode. Thus, a given signal at a given frequency propagating in the first order $LP_{01}$ mode will have a higher propagation constant $k_{01}$ than a signal than a propagation constant $k_{11}$ of the same signal propagating at the same frequency in the second order $LP_{11}$ mode. Returning to Equation (1), above, the beat length L is thus inversely proportional to the difference ($\Delta k = k_{01} - k_{11}$) in the propagation constants in the two modes. A greater difference $\Delta k$ in the propagation constant results in a smaller beat length and vice versa. Typically, the difference in the propagation constants between the first order $LP_{01}$ propagation mode and the second order $LP_{11}$ propagation mode is greater than the differences in the propagation constants between two polarization modes of a signal in a birefringent fiber. Thus, the beat lengths of the two spatial propagation modes are shorter than the beat lengths of the two polarization modes.

It has been found that if an optical frequency, referred to as a center frequency, is selected to provide a minimum beat length for the first and second order propagation modes, the frequency of the optical signal can be varied substantially above and below the center frequency without causing a significant change in the difference between the propagation constants of the two modes. Thus, the beat length of the two propagation modes does not vary significantly at frequencies near the center frequency. Therefore, the beat length is relatively insensitive to changes in optical frequency over a relatively broad optical frequency range in comparison to the sensitivity of the beat length between two polarization modes of a birefringent fiber.

It has been discovered that when an optical fiber is formed into a series of periodic bends which are spaced by a beat length, then the coupling between the two spatial propagation modes of an optical signal traveling through the fiber will have a cumulative effect. As illustrated in FIG. 4, a length of a fiber 200 has a series of small bends 202, 204, 206, 208, 210, 212 and 214, referred to as microbends, which are spaced apart such that the distance between corresponding bends (i.e., between bends in the same direction) is substantially equal to L, the beat length of an optical signal passing through the fiber 200. The effect of each section having a length of L is cumulative with each other section having a length of L to cause a cumulative coupling of optical energy from one mode to another mode in the fiber 200. This effect was demonstrated in theory in "Bending Effects in Optical Fibers," Henry F. Taylor, *Journal of Lightwave Technology*, Vol. LT-2, Pages 616–633 (1984). In that paper, the periodic microbends were introduced by statically positioning the fiber between opposing periodic structures. Thus, the coupling between the modes was a static coupling which did not effect any change in the frequency of the optical signal in the coupled mode.

FIG. 5 illustrates an embodiment of the present invention in which a traveling periodic microbend is introduced into a multimode fiber to cause light to be coupled from one mode to another and to be shifted in frequency. The present invention comprises an optical fiber 300, having a first end portion 302 into which an optical signal, represented by an arrow 304, is introduced at a first angular frequency $\omega_0$. The fiber 300 is secured to a transducer 310. The transducer 310 is preferably a shear transducer comprising PZT (lead-zirconium-titanate), lithium niobate (LiNbO$_3$) or another piezoelectric material. As shown in FIG. 5a, the fiber 300 may advantageously have a small portion of its outer cladding removed to form a flat surface 312 which rests on a top surface 314 of the transducer 310 to thereby provide additional mechanical contact between the transducer 310 and the fiber 300. The fiber 300 can be secured to the transducer 310 by epoxy 316 or other securing means.

The transducer 310 is driven by an electrical signal source 320 (shown schematically), which, in the preferred embodiment, is an a.c. source. When activated by the source 320, the transducer 310 operates in the shear mode as illustrated in FIGS. 6a–6e. The transducer 310 is shown in cross section in FIG. 6a with the fiber 300 mounted to the top surface 314 of the transducer 310. The transducer 310 has a first side 324 and a second side 326. At rest, the cross section of the transducer 310 is substantially rectangular. When the electrical signal 320 is applied to the transducer 310 with a first polarity, the transducer 310 operates in the shear mode causing the first side 324 and the second side 326 to be displaced in opposite directions indicated by the arrows 328 and 330, respectively, in FIG. 6b. This causes the fiber 300 to be displaced at an angle with respect to the rest position shown in FIG. 6a. When the a.c. electrical signal applied to the transducer 310 reaches a zero crossing, the first side 324 and second side 326 return to their rest positions as illustrated in FIG. 6c, thus returning the fiber 300 to its rest position. When the a.c. electrical signal is applied to the transducer 310 with the opposite polarity to the polarity applied in FIG. 6b, the first side 324 and the second side 326 are displaced in directions indicated by the arrows 332, 334 in FIG. 6d. This displacement is opposite to the displacement illustrated in FIG. 6b. Thus, the fiber 300 is displaced at an angle opposite the angle of displacement in FIG. 6b. When the a.c. electrical signal again reaches zero crossing, the first side 324 and the second side 326 again return to their rest positions and the fiber 300 thus returns to its rest position as illustrated in FIG. 6e. In the preferred embodiment, the a.c. electrical signal is applied to the transducer 310 so that the fiber 300 is periodically displaced to thereby induce a flexural wave in the fiber 300 which propagates as a series of traveling microbends along the length of the fiber 300 away from the transducer 310. The traveling microbends have a frequency that is determined by frequency of the a.c. source 320.

The present invention preferably includes a first damper 336 formed of damping material which surrounds the fiber 300 at a location proximate to the side 324 of the transducer 310. Thus, any flexural wave which travels away from the transducer 310 in the direction towards the damper 336 is suppressed. Therefore the flexural waves travel away from the transducer 310 in one direction only, as indicated by an arrow 340 in FIG. 5. The damper 336 can advantageously be supported by a first support block 342. The first support block 342 can als serve as a mounting block for the transducer 310 to hold the transducer 310 in a fixed relationship to the damper 336. The present invention also preferably includes a second damper 34,, formed of damping material through which the fiber 300 passes to thereby suppress any further propagation of the traveling microbends so that the microbends have no further effect beyond the second damper 344. The second damper 344 is preferably supported by a second support block 346. The second damper 344 is positioned so that only a selected length of the optical fiber 300 is affected by the traveling microbends. In some applications, in which a long interaction length may be desired, the second damper 344 may not be necessary as the traveling microbend wave will be attenuated by the length of the fiber 300. The optical fiber 300 can be suspended in air, vacuum, or another medium between the first support block 342 and the second support block 346. The medium can be any material which does not attenuate the traveling microbend waves and which does not conduct any of the energy away from the optical fiber 300. It is not necessary that the fiber 300 be taut between the first and second support blocks 342, 346, nor is it necessary that the fiber be straight so long as the fiber 300 is not bent with a radius sufficiently small so that the optical signal in the fiber 300 is perturbed by the bend.

The frequency of the electrical signal applied to the transducer 310 is chosen so that the flexural wave thus produced has a wave length along the fiber which is substantially equal to the beat length L as indicated in FIG. 5. Thus, as discussed above, the coupling of optical energy from one propagation mode to the other propagation mode will be reinforced in each section of the fiber. However, unlike the previously discussed static microbend device, the microbends in the fiber 300 propagate along the length of the fiber 300 at a velocity $v_p$. The propagation velocity $v_p$ is determined by the particular characteristics of the fiber 300. The frequency of the electrical signal applied to the transducer 310 (referred to hereinafter as $f_a$) is selected so that the wave length (referred to hereinafter as $\lambda_a$) of the propagating microbend is substantially equal to the beat length L. Since the frequency $f_a$ is equal to the velocity $v_p$ divided by the wave length $\lambda_a$, then the frequency $f_a$ is determined by:

$$f_a = \frac{v_p}{\lambda_a} = \frac{v_p}{L} \quad (3)$$

The angular frequency $\omega_a$ of the electrical signal is $\omega_a = 2\pi f_a$.

It has been shown that when a propagating acoustic wave causes a periodic, traveling stress on an optical fiber, the effect of the traveling acoustic wave is to cause light to be coupled from one polarization mode to another polarization mode and be shifted in frequency. See for example "Single-Sideband Frequency Shifting in Birefringent Optical Fiber," W. P. Risk, et al., *SPIE Vol. 478—Fiber Optic and Laser Sensors II* (1984), pp. 91–97, in which this effect is discussed with respect to coupling between polarization modes in a birefringent fiber. A similar effect has been described for multimode fibers for an externally applied stress to the fiber. See, for example, co-pending U.S. Application Ser. No. 556,636, "Single-mode Fiber Optic Single-sideband Modulator", filed Nov. 30, 1983, and assigned to the same assignee as the present application. Thus, an optical signal, illustrated as an arrow 350, exiting from a second end portion 352 of the fiber 300 exits at an angular frequency $\omega_s$, which is shifted in frequency from the angular frequency $\omega_0$ which was input at the first end portion 302 of the fiber 300. As will be shown below, the frequency $\omega_s$ is equal to the angular frequency $\omega_0$ plus or minus the angular frequency $\omega_a$ of the signal applied to the transducer 310 (i.e., $\omega_s = \omega_0 \pm \omega_a$). Whether the frequency $\omega_a$ is added to or subtracted from the frequency $\omega_0$ is determined by whether the signal is input in the first order $LP_{01}$ mode or the second order $LP_{11}$ mode and whether or not the optical signal is propagating in the same direction as the propagating microbend. The embodiment of FIG. 5 is bidirectional in that the optical signal $\omega_0$ can be introduced into the second end portion 352 and thereby be caused to propagate towards the first end portion 302 in a direction opposite the direction of propagation of the traveling microbend.

Figure 7B:
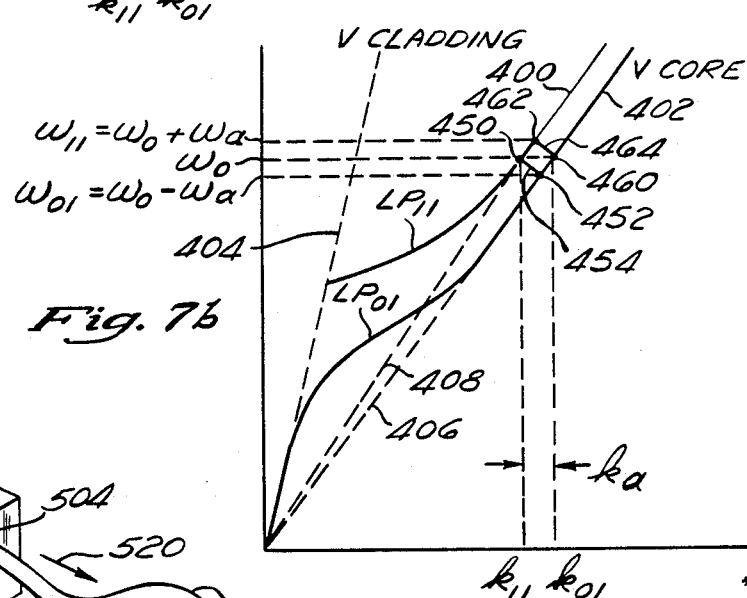
FIG. 7b is a graphical representation of the coupling between the propagation modes when the optical signal is traveling in the opposite direction as the direction of propagation of the traveling microbends.

The frequency shifting referred to above can be understood further by referring to FIGS. 7a and 7b which illustrate $\omega$-k diagrams that help explain the frequency shifting effect of the invention illustrated in FIG. 5. FIG. 7a is an $\omega$-k diagram for an optical signal which propagates through the fiber 300 in the same direction as the propagation of the traveling flexural wave or microbend generated by the transducer 310. The horizontal axis represents the phase propagation constant k of the optical signal. The vertical axis represents the angular frequency $\omega$ of the optical signal. As illustrated, the phase propagation constant varies with the frequency (i.e., as the frequency $\omega$ increases, the propagation constant k increases). As is well known, the relationship between the phase propagation constant and the frequency varies with the phase propagation velocity through the optical fiber 300. This is illustrated by a first graph 400 corresponding to the $LP_{11}$ mode and a second graph 402 corresponding to the $LP_{01}$ mode. At any particular frequency, the slope of a line from a location on one of the graphs 400 or 402 to the origin represents the phase propagation velocity at that frequency in the respective mode (i.e., velocity = slope = $\omega/k$ = (radians/sec) ÷ (radians/meter) = (meters/sec). The first and second graphs 400 and 402 are bounded by a dashed line 404 representing the velocity of a signal propagating through a medium having the same refractive index as the cladding and bounded by a dashed line 406 representing the velocity of a signal propagating through a medium having the same refractive index as the core. Since the optical energy propagating in the $LP_{01}$ mode is concentrated in the core of the fiber, the second graph 402 is shown to be asymptotic to the line 406 at higher frequencies. Similarly, since the optical energy propagating in the $LP_{11}$ mode is dispersed more towards the cladding, the graph 400 is offset from the graph 402 towards the line 404. In other words, the phase velocity of the $LP_{11}$ mode is greater than the phase velocity of the $LP_{01}$ mode. The phase velocity of the $LP_{11}$ mode at the angular frequency $\omega_o$ is shown as a line 408 that represents the slope of the $LP_{11}$ $\omega$-k graph 400 at that frequency. As illustrated, the line 408 has a greater slope than the slope of the $LP_{01}$ $\omega$-k graph 402 at that frequency. One skilled in the art will recognize that the graphs 400 and 402 converge asymptotically at very large optical frequencies although they are shown as essentially parallel lines at the frequencies of interest in FIGS. 7a and 7b.

First consider a light signal input into the optical fiber 300 at a first frequency $\omega_0$ in the slow $LP_{01}$ optical mode. Referring to the graph 402, the frequency $\omega_0$ at a location 412 corresponds to a propagation constant $k_{01}$. On the other hand, if the optical signal is introduced into the optical fiber 300 at the frequency $\omega_0$ in the fast $LP_{11}$ optical mode, the frequency $\omega_0$ intersects the graph 400 at a location 414 corresponding to a propagation constant of $k_{11}$, which is less than the propagation constant $k_0$. As set forth in the above-referenced paper, "Single-Sideband Frequency Shifting in Birefringent Optical Fiber," by W. P. Risk, et al., when a traveling acoustic wave stresses an optical fiber having an optical signal propagating therein in the same direction as the traveling acoustic wave, the frequency of the traveling acoustic wave will be subtracted from the frequency of the optical signal if the optical signal is initially traveling in the slow optical mode (a first polarization mode in the Risk paper). On the other hand, if the optical signal is initially traveling in the fast optical mode (a second polarization mode in the Risk paper), the frequency of the acoustic wave is added to the original frequency $\omega_0$ of the optical signal. A similar effect occurs when the fiber is flexed by the traveling microbend having a frequency $\omega_a$ in the present invention. This effect is illustrated in FIG. 7a as a first shift along a line 420 from the location 412 on the $LP_{01}$ graph 402 to a location 422 on the $LP_{11}$ graph 400. Thus, the light input in the slow $LP_{01}$ optical mode at the frequency $\omega_0$ is coupled from the slow $LP_{01}$ optical mode to the fast $LP_{11}$ optical mode and is downshifted in frequency by an amount of $\omega_a$ to a frequency shown as $\omega_{11}$ (i.e., $\omega_{11} = \omega_0 - \omega_a$). On the other hand, light initially input at the frequency $\omega_0$ in the fast $LP_{11}$ optical mode, illustrated at the location 414 on the $LP_{11}$ graph 400, is upshifted in frequency along a line 424 to a location 426 on the $LP_{01}$ graph 402. Thus, the light input in the fast $LP_{11}$ optical mode at the frequency $\omega_0$ is shifted upward in frequency by an amount $\omega_a$ to a frequency $\omega_{01}$ (i.e., $\omega_{01}=\omega_o+\omega_a$) in the $LP_{01}$ optical mode.

In FIG. 7a, the slope of the line 420 and the slope of the line 424 represent the velocity $v_p$ of the traveling microbend which propagates along the fiber 300 (i.e., $v_p=\omega_a/k_a$). Thus, as illustrated in FIG. 7a, the slope (i.e., the velocity) of the traveling microbend is shown as positive (i.e., in the same direction) with respect to the slopes (i.e., the velocities) of the two propagation modes illustrated by the graphs 400 and 402.

The effect of the traveling microbend on the optical signal when the traveling microbend propagates in the opposite direction as the optical signal is illustrated in FIG. 7b. In FIG. 7b, the graphs 400 and 402 again represent the relationships between the frequency and the propagation constant for the fast $LP_{11}$ optical mode and the slow $LP_{01}$ optical mode, respectively, as in FIG. 7a. An optical signal input at a frequency $\omega_0$ in the fast $LP_{11}$ optical mode, corresponding to a location 450 on the $LP_{11}$ graph 400, will be shifted to the slow $LP_{01}$ optical mode at a location 452 on the $LP_{01}$ graph 402. This coupling is represented by the addition of a line 454, corresponding to the velocity of the traveling microbends in the fiber 300. The slope of the line 454 is in the opposite direction to the slopes representing the velocities of the optical modes because the microbends are traveling in the opposite direction as optical propagations. When the acoustic wave is traveling in the opposite direction of the light wave, the coupling from the fast $LP_{11}$ optical mode to the slow $LP_{01}$ optical mode causes a downshift in the frequency from the original frequency $\omega_0$ to a new frequency $\omega_{01}$ (i.e., $\omega_{01}=\omega_o-\omega_a$). This is the opposite effect from the frequency shift that occurs when the optical signal and the microbends are propagating in the same direction, as illustrated by FIG. 7a. Similarly, when the light initially travels in the slow $LP_{01}$ optical mode, represented by a locatin 460 on the $LP_{01}$ graph 402, the light is coupled to the fast $LP_{11}$ optical mode, illustraed by a location 462 on the $LP_{11}$ graph 400. The coupling is represented by the addition of a line 464, representing the velocity of the traveling microbend, to the location 460 on the $LP_{01}$ graph 402. As illustrated, the coupled light has a frequency $\omega_0$ (i.e., $\omega_{11}=\omega_o+\omega_a$).

The foregoing can also be considered in terms of the summation of the propagation constants of the two optical modes and the traveling microbends. As illustrated in FIGS. 7a and 7b, for proper phase matching between the traveling microbends and the optical signal, the propagation constants must satisfy the following mathematical relationship:

$$k_{11}+k_a=k_{01} \quad (4)$$

Thus, when the optical signal is initially traveling in the $LP_{11}$ mode, the propagation constant $k_a$ of the traveling microbends is added to the propagation constant $k_{11}$ of the optical signal in the $LP_{11}$ optical mode to obtain the propagation constant $k_{01}$ of the $LP_{01}$ optical mode as set forth in Equation (4) above. Similarly, when the optical signal is initially traveling in the $LP_{01}$ optical mode, the propagation constant $k_a$ of the traveling microbends is subtracted from the propagation constant $k_{01}$ of the $LP_{01}$ mode to obtain the propagation constant $k_{11}$ of the $LP_{11}$ optical mode as follows:

$$k_{01}-k_a=k_{11} \quad (5)$$

The resulting frequency of the coupled optical signal depends upon whether the velocity of the traveling microbends is in the same direction as the direction of propagation of the optical signal, as illustrated in FIG. 7a, or in the opposite direction if the propagation of the optical signal, as illustrated in FIG. 7b.

The frequency shifting can be expressed mathematically by representing the light in the fast $LP_{11}$ optical mode as $\cos(\omega_0 t - k_{11}Z)$, where $\omega_0$ is the initial frequency of the input light, t is time and Z is the distance in the direction of propagation 340 of the traveling microbends along the fiber 300. The traveling microbends may be represented as $\cos(\omega_a t - k_a Z)$, where $\omega_a$ is the frequency of the traveling microbends, $k_a$ is the propagation constant of the traveling microbends and Z is the distance along the axis of the fiber 300 in the direction of propagation of the microbends. The interaction of the optical signal with the traveling microbends leads to a product term proportional to the following expression:

$$\tfrac{1}{2}\{\cos[(\omega_0+\omega_a)t-(k_{11}+k_a)Z]+\cos[(\omega_0-\omega_a)t-(k_{11}-k_a)Z]\} \quad (6)$$

The second term of Expression (6) does not satisfy the phase matching condition of either Equation (4) or Equation (5) above. The first term in the expression is phase matched in accordance with Equation (4). This match explicitly indicates that the optical signal in the $LP_{01}$ mode is upshifted in frequency to the frequency $\omega_{01}=\omega_0+\omega_a$. A similar analysis for interaction of an optical signal in the $LP_{01}$ mode leads to a product term proportional to the following expression:

$$\tfrac{1}{2}\{\cos[(\omega_0-\omega_a)t-(k_{01}-k_a)Z]+\cos[(\omega_0+\omega_a)t-(k_{01}+k_a)Z]\} \quad (7)$$

The second term in Expression (7) is not phase matched in accordance with either Equation (4) or Equation (5) above. The first term does meet the phase matching requirements of Equation (5). This explicitly indicated that the $LP_{11}$ mode is downshifted in frequency to the frequency $\omega_{11}=\omega_0-\omega_a$. One can readily see that Expressions (6) and (7) conform to the frequency shifting illustrated in FIG. 7a.

If the optical signal propagates in the opposite direction as the traveling microbends, the traveling microbend can be represented as $\cos(\omega_a+k_a Z)$. The interaction of an optical signal in the $LP_{11}$ mode with the traveling microbend leads to a product term proportional to the following expression:

$$\tfrac{1}{2}\{\cos[(\omega_0+\omega_a)t-(k_{11}-k_a)Z]+\cos[(\omega_0-\omega_a)t-(k_{11}+k_a)Z]\}, \quad (8)$$

The first term in Expression (8) does not provide proper phase matching in accordance with either Equation (4) or Equation (5). The second term does provide proper phase matching in accordance with Equation (4). Thus, when the optical signal propagates in the opposite direction to the traveling microbends, the light coupled to the $LP_{01}$ mode is downshifted in frequency from the light input in the $LP_{11}$ mode to a frequency $\omega_{01}=\omega_0-\omega_a$ instead of being upshifted as discussed above with regard to Expression (6) for light propagating in the same direction. When the optical signal is initially in the LP$_{01}$ mode and propagates in the opposite direction as the traveling microbends, the interaction of the optical signal and the microbends leads to a product term proportional to the following expression:

$$\tfrac{1}{2}\{\cos(\omega_0-\omega_a)t-(k_{01}+k_a)Z]+\cos[(\omega_0+\omega_a)t-(k_{01}-k_a)Z]\} \qquad (9)$$

The first term in Expression (9) is not properly phase matched in accordance with either Equation (4) or Equation (5). The second term is properly phase matched in accordance with Equation (5). Thus, the optical energy coupled from the LP$_{01}$ mode to the LP$_{11}$ mode is shifted upward in frequency to a frequency $\omega_{11}=\omega_0+\omega_a$. One can see that Expressions (8) and (9) conform to the frequency shifting illustrated in FIG. 7b.

The present invention has many advantages. For example, the present invention uses a symmetrical multimode fiber rather than a birefringent fiber. Thus, the present invention does not require precise alignment of the birefringent axes of a birefringent fiber with the transmission axes of polarizers at first and second ends of the fiber such as is required by some exemplary devices which couple between polarization modes.

The present invention is particularly advantageous in that it operates over a broad range of optical frequencies for the input optical signal. This advantage results from the use of the spatial propagation modes for coupling. As set forth above, the beat length of the two spatial propagation modes (e.g., the LP$_{01}$ and LP$_{11}$ modes) does not vary significantly over a broad optical frequency range. Thus, the beat length will match the wavelength of the traveling microbend wave even when the optical frequency of the input optical signal is varied over a broad frequency range about the selected center frequency where the optical beat length and the wavelength of the traveling microbends match exactly.

The frequency of the a.c. signal modulation applied to the transducer 310 (FIG. 5) can also be varied over a relatively broad range in the present invention. The broad range of modulation frequencies results from two features of the present invention. The first feature of the present invention that provides for operation over a broad modulation frequency range is that it couples optical energy between the spatial propagation modes The beat length of the two spatial propagation modes is substantially smaller than the beatlength between the polarization modes of an optical signal at the same frequency. Thus, the present invention operates at a higher absolute modulation frequency than an exemplary device which couples optical energy between polarization modes. The present invention operates with optical beat lengths of approximately 200 μm to 400 μm and thus can operate with a microbend frequency of approximately 10 MHz to 20 MHz. The second feature of the present invention that provides for operation over a broad modulation frequency range is that the modulation energy from the transducer 310 (FIG. 5) is coupled directly into the fiber 300 to induce the traveling, periodic microbend wave. The present invention does not require a substrate or other medium external to the fiber 300 to conduct the modulation energy to the fiber 300. Thus, a relatively large percentage of the modulation energy acts upon the fiber 300 to create the traveling microbend wave Therefore, for a given modulation energy input, it is believed that a larger percentage of the optical energy is transferred from one spatial propagation mode to the other spatial propagation mode in each beat length. Thus, relatively fewer beat lengths of interaction between the optical signal and the traveling microbend wave are required to couple substantially all of the optical energy from one spatial propagation mode to the other spatial propagation mode. It has been shown that coupling between the spatial propagation modes will occur even when there is a small percentage of deviation from the modulation wavelength which corresponds exactly with the beat length of the two spatial propagation modes so long as the deviation is not allowed to accumulate to a large total percentage of deviation over a large number of beat lengths. Thus, since relatively few beat lengths are required in the present invention to couple the optical energy from one spatial propagation mode to the other spatial propagation mode, the acceptable percentage of deviation in one beatlength can be relatively large (relative to a device requiring a large number of beat lengths). The relatively large percentage of acceptable deviation in wavelength combined with the relatively large absolute modulation frequency results in a relatively broad range for the modulation frequency.

The present invention is particularly advantageous in that the energy required to cause the coupling between the modes is concentrated entirely within the fiber 300. Substantially all of the energy applied to the transducer 310 is transferred to the optical fiber 300 to produce the periodic microbend. Thus, very little, if any energy is wasted in the present invention. Thus, the mechanical energy generated by the transducer 310 is utilized very efficiently.

Figure 8:
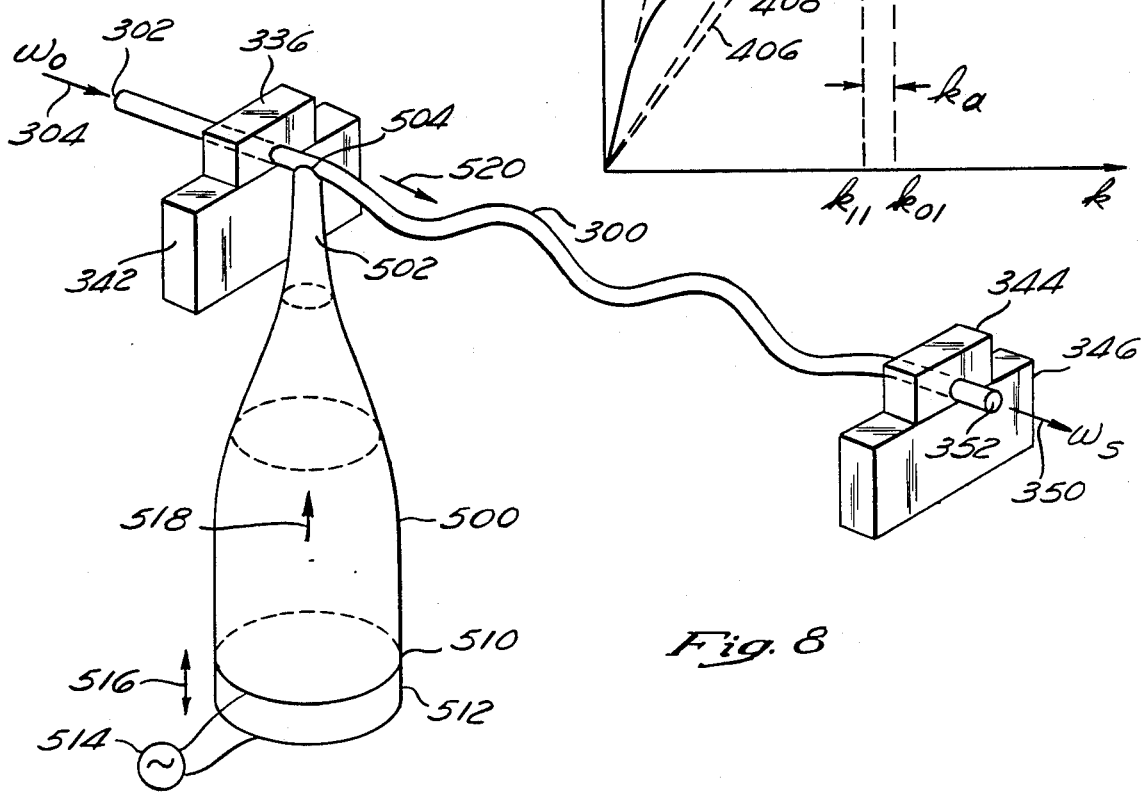
FIG. 8 is a perspective illustration of a preferred embodiment of a transducer to generate the traveling microbends in the optical fiber.

FIG. 8 illustrates an alternative embodiment of the present invention in which the transducer 310 of FIG. 5 is replaced with a transducer 500 particularly adapted to generate the periodic microbends described above. The transducer 500, in the preferred embodiment comprises a rod of fused quartz having a substantially circular cross section throughout its length. A first end 502 of the transducer 500 has a diameter substantially equal to the diameter of the fiber 300. For example, in one embodiment of the present invention, the diameter of the fiber 302 and of the first end 502 of the transducer 500 is approximately equal to 100 μm. Preferably, the transducer 500 and the optical fiber 300 are fused together at a location 504 to provide good acoustic contact between the fiber 302 and the second end 502 of the transducer 500.

The transducer 500 has a second end 510 which has a diameter which is substantially larger than the diameter of the first end 502. For example, the second end 510 can have a diameter of approximately two millimeters. In the preferred embodiment, the transducer 500 is formed from a rod of solid fused quartz having an initial diameter of two millimeters or larger and by drawing the quartz rod into a form which gradually tapers from the second end 510 to the smaller first end 502.

A piezoelectric material 512, such as PZT, is bonded to the second end 510 of the transducer 500 in a manner well-known to the art. When an electrical signal, represented schematically as a signal generator 514, is applied to the piezoelectric material 512, the piezoelectric material 512 expands and contracts in the directions indicated by the double-headed arrow 516 and generates a series of acoustic wavefronts which propagate through the transducer 500 from the second end 510 to the first end 502, as indicated by an arrow 518. At the first end 502, the acoustic energy in the transducer 500 is coupled directly to the optical fiber 300 at the location 504 to cause up and down movement of the fiber 300, thus inducing a vibration in the fiber 300 which propagates away from the location 504 as a traveling flexural wave or traveling microbend as described above with respect to FIG. 5. The solid quartz of the transducer 500 acts as an acoustic funnel which concentrates the acoustic energy developed at the second end 510. Thus, in the example presented, when the second end 510 has a diameter of approximately 20 times the diameter of the first end, the acoustic energy per unit area applied to the first end 502 is approximately 400 times the acoustic energy per unit area applied to the second end 510. Furthermore, substantially all of the acoustic energy applied to the second end 510 is conducted to the first end 502 and is used to induce the traveling microbend in the fiber 300.

As in FIG. 5, the embodiment of FIG. 8 further includes the first damper 336, proximate to the location 504, to limit the travel of the microbend in the fiber 302 to one direction, indicated by an arrow 520, away from the damper 336. The embodiment of FIG. 8 also preferably includes the second damper 344 to suppress propagation of the microbends beyond a selected length of the fiber 300 as discussed above.

While the embodiments of the present invention described above employ light and an optical fiber which are matched to each other to allow propagation only in the first and second order modes, the present invention may alternatively employ light and optical fibers matched to each other to provide coupling between higher order propagation modes.

Figure 9:
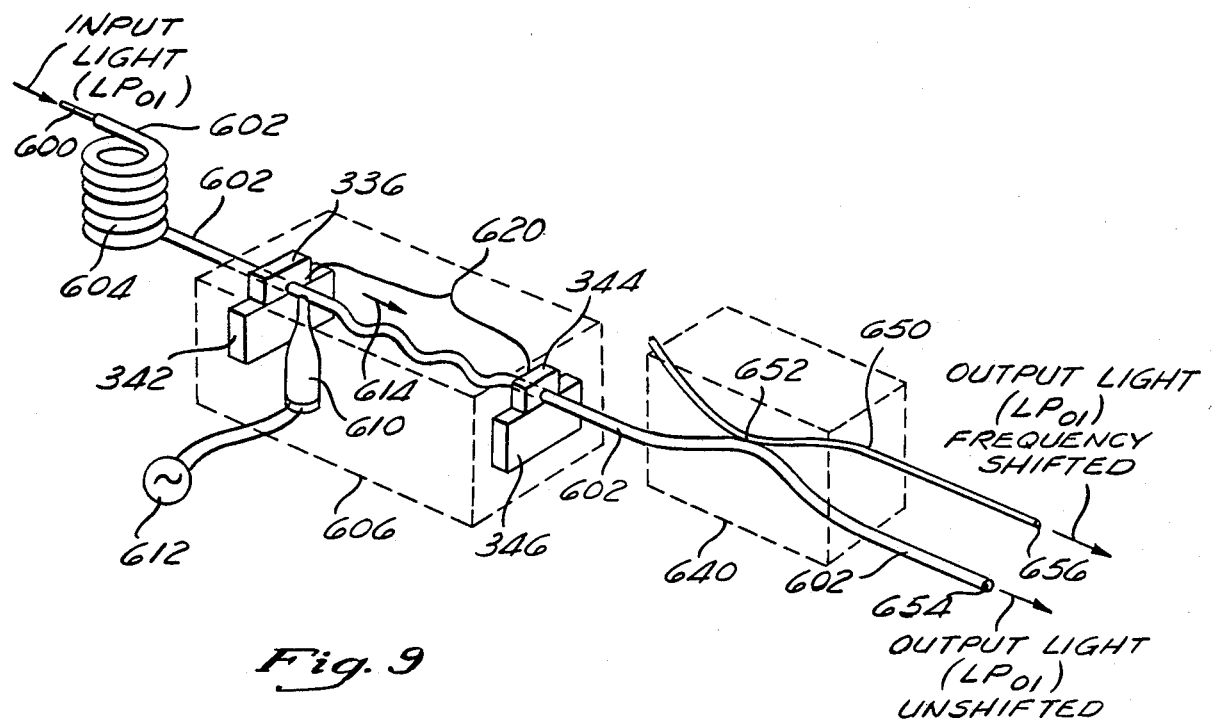
FIG. 9 is a pictorial illustration of the present invention in combination with a fiber optic mode selector to produce an optical output signal from the mode selector which is shifted in frequency from an optical signal input into the combination.

FIG. 9 illustrates the present invention in use as an inter-propagation mode frequency shifting modulator. The modulator comprises an input optical fiber 600, which is preferably a single-mode optical fiber which propagates input light only in the first order $LP_{01}$ propagation mode. The input fiber 600 is coupled to a second fiber 602 by butt-splicing or other known methods. The second fiber 602 is preferably a multimode fiber, and more preferably, a double-mode fiber. The second fiber 602 is formed into a mode stripper 604 which is advantageously a series of tightly wound turns of the fiber 602. As is well-known in the art, a mode stripper formed in this manner will cause any residual light in a higher order mode (e.g., the $LP_{11}$ mode) to be radiated from the fiber in the turns. Thus, substantially all of any light which may enter the fiber 602 in the $LP_{11}$ mode from the fiber 600 will be eliminated in the mode stripper 604. Alternative mode strippers can also be advantageously used to remove any optical energy traveling in the $LP_{11}$ mode. The multimode fiber 602 on the other end of the mode stripper 604 then passes to an inter-mode frequency shifter 606, built in accordance with the present invention.

In the embodiment illustrated in FIG. 9, the inter-mode frequency shifter comprises the damper 336, described above. The fiber 602 passes through the damper 336 to suppress any vibrations and also to prevent the traveling microbends from traeling in the reverse direction, as described alone in connection with FIGS. 5 and 8. The inter-mode frequency shifter 606 further comprises a transducer 610 which can be the transducer 500 described above in connection with FIG. 8, or the transducer 310, described above in connection with FIG. 5. The transducer 610 is driven by an a.c. signal source 612. The optical fiber 602 is connected to the transducer 610 so that mechanical movement of the transducer 610 is coupled to the fiber 602 to cause microbends to propagate in the fiber 602 in a direction, indicated by an arrow 14, away from the damper 336 along a length 620 of the fiber 602. Thus, an optical signal within the fiber 602 in the $LP_{01}$ mode is coupled to the $LP_{11}$ mode, as described above. Preferably, the inter-mode frequency shifter 606 also includes the second damper 344 which prevents the vibrations induced into the length 620 of the fiber 602 from passing beyond the length 620.

After passing through the inter-mode frequency shifter 606, the fiber 602 then passes through a fiber optic mode selector 640 for multimode signals, such as that described in copending U.S. patent application Ser. No. 820,411, entitled "Fiber Optic Mode Selector," filed on the same day as the present application, and assigned to the same assignee. As described in the copending application, in the mode selector 640 only that light which is propagating in the second order $LP_{11}$ mode is coupled out of the double-mode fiber 602 into a juxtaposed adjacent single-mode fiber 650 at an interaction region 652. The fiber 650 is selected so that an optical signal propagating in the $LP_{01}$ mode in the fiber 650 has a phase propagation velocity which matches the phase propagation velocity of the light propagating in the $LP_{11}$ mode in the fiber 602. Any light remaining in the first order $LP_{01}$ mode remains in the fiber 602 and exits from a second end 654 of the fiber 602 as light in the original unshifted frequency. The light coupled to the single-mode optical fiber 650 exits from an end 656 of the fiber 650 as frequency shifted light in the first order $LP_{01}$ mode of the fiber 650. The frequency of the light which exits from the end 654 of the fiber 650 is equal to the frequency of the light which was input into the single mode fiber 600 in the first order $LP_{01}$ mode minus the frequency of the acoustic signal applied to the transducer 610 in the inter-mode frequency shifter 606. The downward shift in frequency corresponds to the shift from the location 412 on the graph 402 to the location 422 on the graph 400 in FIG. 7a.

The a.c. signal applied to the transducer 610 by the a.c. signal source 612 can be varied in frequency, thereby varying the frequency of the optical signal that exits from the end 654 of the fiber 650. The amplitude of the a.c signal applied to the transducer 610 can be varied to vary the percentage of light coupled from the $LP_{01}$ mode to the $LP_{11}$ mode in the frequency shifter 606 and thus vary the amplitude of the optical signal that exits from the end 654 of the fiber 650.

The system of FIG. 9 is reciprocal. An optical signal can be introduced into the end 654 of the optical fiber 650 so as to propagate towards the interaction region 652 of the mode selector 640 in the $LP_{01}$ propagation mode. The mode selector 640 operates reciprocally so that the optical signal in the $LP_{01}$ mode in the fiber 650 is coupled to the $LP_{11}$ mode in the fiber 602. The optical signal then propagates in the $LP_{11}$ mode from the interaction region 652 towards the frequency shifter 606 and thus propagates to the length 620 of the fiber 602 in which the traveling microbends are propagating. The optical signal propagates through the length 620 of the fiber 602 in a direction opposite the direction indicated by the arrow 614 and thus propagates in the direction opposite the direction of propagation of the traveling microbends. Thus, referring to FIG. 7b, the optical signal traveling in the $LP_{11}$ mode is coupled to the $LP_{01}$ mode and is shifted down in frequency (i.e., from the location 450 on the graph 400 to the location 452 on the graph 402). The optical signal then passes through the mode stripper 604 wherein any optical signal remaining in the $LP_{11}$ mode is stripped from the fiber leaving only the optical signal propagating in the $LP_{01}$ mode at the shifted frequency to be coupled to the single-mode fiber 600 which, in this example, serves as an output fiber.

The embodiment of FIG. 9 can be used to shift an optical signal upward in frequency by locating the transducer 610 proximate to the second damper 344 rather than roximate to the first damper 336, thus causing the traveling microbends to travel in the length 620 of the fiber 602 in a direction opposite the direction indicated by the arrow 614. Thus, light input into the single-mode fiber 600 and propagating toward the single-mode fiber 650 will be shifted upward in frequency in accordance with the shift from the location 460 on the graph 402 to the location 462 on the graph 400 in FIG. 7b. Light input into the single-mode fiber 650 and propagating towards the single-mode fiber 600 will be shifted upward in frequency in accordance with the shift from the location 414 on the graph 400 to the location 426 on the graph 402.

Figure 22A:
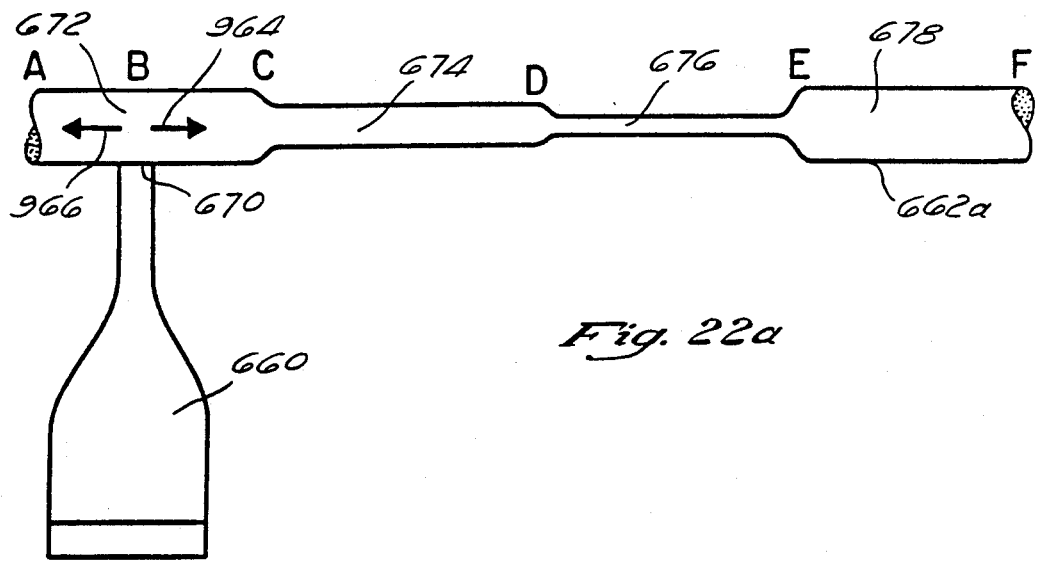
FIG. 22a illustrates an alternative embodiment of the present invention utilizing an optical fiber having a plurality of portions with differing radii to provide interaction regions responsive to a plurality of acoustic frequencies.
Figure 22B:
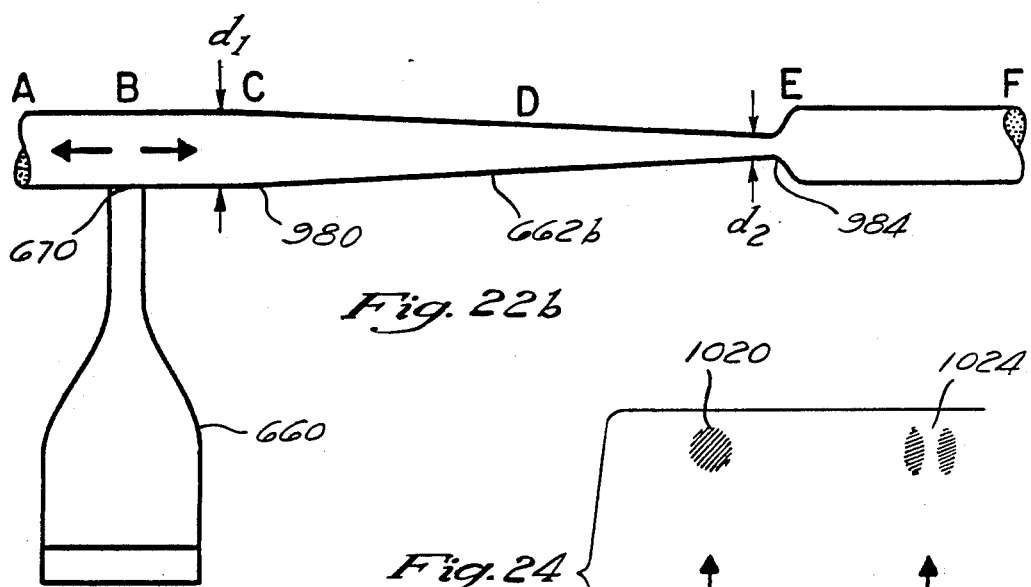
FIG. 22b illustrates an alternative embodiment of the present invention in which the radius of the optical fiber varies gradually.

Two alternative embodiments of the present invention are illustrated in FIGS. 22a and 22b. The frequency shifters of FIGS. 22a and 22b include an acoustic horn 660 having an end 670 attached to an optical fiber 662a FIG. 22a) or 662b (FIG. 22b). Unlike the previously described optical fibers of FIGS. 1 to 9, the optical fibers 662a and 662b of FIGS. 22a and 22b do not have uniform outer cladding diameters. Rather, the optical fiber 662a has a plurality of sections having differing outer cladding diameters. For example, the optical fiber 662a is shown as having a first portion 672, having a first outer diameter; a second portion 674, having a second outer diameter; and a third portion 676, having a third outer diameter. In an exemplary embodiment, the first outer diameter is 42.5 $\mu$m, the second outer diameter is 26.5 $\mu$m and the third outer diameter is 16 $\mu$m. The fiber 662b of FIG. 22b has a gradual taper in the outer diameter cladding of the fiber from a relatively large outer diameter (e.g., 42.5 $\mu$m) to a relatively small outer diameter (e.g., 16 $\mu$m). The frequency shifters of FIGS. 22a and 22b provide means for selectively shifting the frequency of an optical signal propagating in the fiber 622a and 662b by one of a plurality of acoustic frequencies while maintaining optimum or near-optimum acousto-optic coupling efficiency in the fibers 662a and 62b.

Prior to describing the operation of the embodiments of FIGS. 22a and 22b, the solutions of the wave equations which describe the characteristics of the propagation and optical interaction of guided waves in two-mode optical fibers will be presented. The discussion is also applicable to the operation of the acoustic horn 660, as well as an improved acoustic horn which will also be presented.

Figure 10A:
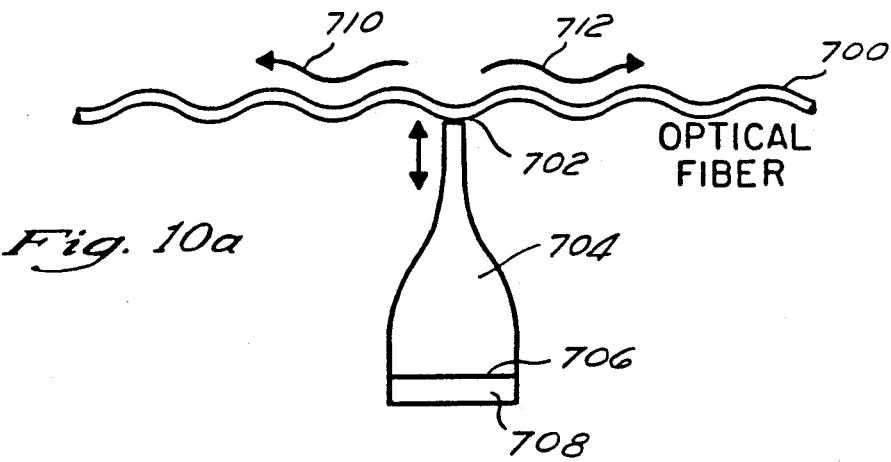
FIG. 10a is an illustration of an embodiment of the present invention showing the acoustic horn and the optical fiber.

The following describes the excitation and propagation of acoustic waves in optical fibers which have no acoustic cladding. As has been shown above, acoustic flexural waves propagating along a two-mode optical fiber provide an efficient coupling of light between the propagation modes of the fiber. The basic arrangement for excitation of flexural waves in an optical fiber is shown in FIG. 10a. Excitation of the acoustic waves in an optical fiber 700 in FIG. 10a is performed by connecting the optical fiber 700 rigidly to a first small end 702 of an acoustic horn 704, constructed of glass or the like, which propagates acoustic waves of high amplitude. This high amplitude is obtained by exciting lower amplitude waves at a second end 706 of the acoustic horn 704 where the cross section is appreciably larger.

The acoustic horn 704 is tapered between the two ends 702 and 706. Acoustic horns have been used to transform low amplitude oscillations into high amplitudes by changing the cross section of the rod. However, they typically have been limited to resonant structures having the length between the small end and the large end equal to multiples of half an acoustic wavelength and with transverse dimensions small compared to an acoustic wavelength. The embodiment of FIG. 10b describes a non-resonant acoustic horn structure which does not have these limitations and which functions to convert surface acoustic waves at one end of the structure to longitudinal waves at the opposite end of the structure, which in turn excite flexural waves in the optical fibers.

While formal mathematical solutions for acoustic wave propagation in solid cylinders are available in the technical literature, specific solutions are less abundant. Therefore, a more extensive discussion of specific solutions of both dispersion (i.e., the relationship between the velocity of propagation of the acoustic wave and its frequency) and acoustic wave mode behavior is presented below to assist in describing the present invention.

It has been shown in Taylor, "Bending Effects in Optical Fibers," *Journal of Lightwave Technology*, referenced previously, that in a two-mode optical fiber, efficient coupling between the two modes occurs when a static periodic bending of the fiber is introduced. The required periodicity of this bending is determined by the beat length of the fiber for the two modes. As discussed above in connection with FIGS. 1–9, it has been found that when these periodic bendings travel as an acoustic (flexural) wave through the fiber, the optical frequency is shifted by the frequency of the acoustic wave.

In order to more fully understand the properties of the acoustic modes in the previously described frequency shifter, reference is again made to the diagram in FIG. 10a. Flexural acoustic waves propagate along a part of the optical fiber 700 where the plastic jacket has been stripped away. In this area, the acoustic waves suffer only insignificant attenuation. The acoustic horn 704 is constructed from fused silica with the small end 702 having a diameter comparable to that of the fiber 700. The small end 702 is rigidly attached to the fiber 700 as shown. The large end 706 of the horn 704 has a much larger diameter and is connected to an acoustic transducer 708. By tapering the horn 704 between the two diameter values over a sufficiently large length, the amplitudes generated at the large end 706 of the horn will be converted into higher amplitudes at the small end 702 because of the much smaller area. Provided there is an efficient transmission of power from the small end 702 to the fiber 700, the longitudinal movement of the small end 702 of the horn 704 will thus create a flexural wave of large amplitude in the optical fiber 700. Due to the symmetrical setup, flexural waves will be excited in both directions, 710 and 712, along the optical fiber 700. If necessary, acoustic waves propagating in one of the directions can be suppressed by applying a strongly absorbing material on one side of the junction, as described above.

Although only longitudinal motion of the small end 702 has been discussed so far, flexural and torsional movements at the small end 702 will also couple to flexural waves in the optical fiber 700. Therefore, all of these modes will be considered.

As is well known, the optical fiber 700 has a core and cladding for the purpose of light guidance. It will be assumed that the acoustic wavelength of interest is much larger than the dimension of the core of the fiber 700. It will also be assumed, in the following discussion, that the fiber 700 is a homogeneous rod. Further, the discussion disregards any stretching of the fiber 700 which might be of importance when the acoustic wavelength is very long compared to the rod diameter, i.e., for very low frequencies.

In the following discussion, theoretical results are used to calculate numerical relationships between the propagation velocity and the frequency of the acoustic waves propagating in cylindrical rods. For reference purposes, a wide range of material parameters are used and all three mode groups are considered. Phase velocities for several modes within each mode group are calculated. More detailed results are given for fused silica which is the material of most interest for the present invention.

Acoustic Wave Propagation in Cylindrical Rods

Figure 11:
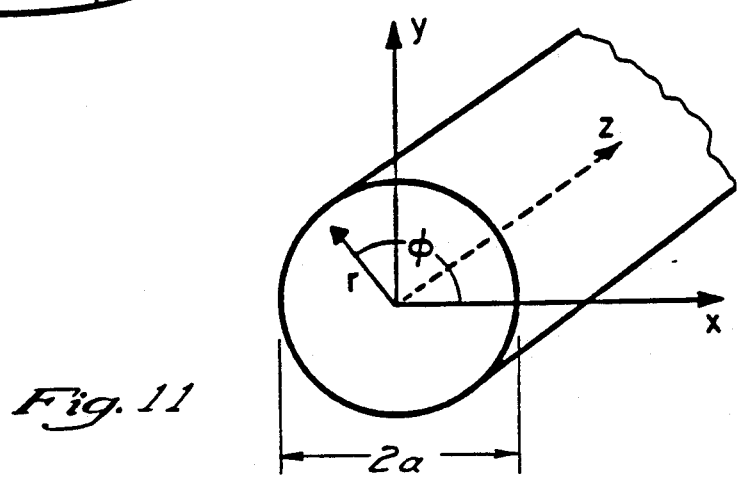
FIG. 11 is a perspective view of a cylindrical rod showing the coordinate system used to mathematically define the acoustic wave propagation in the present invention.
Figure 12A:
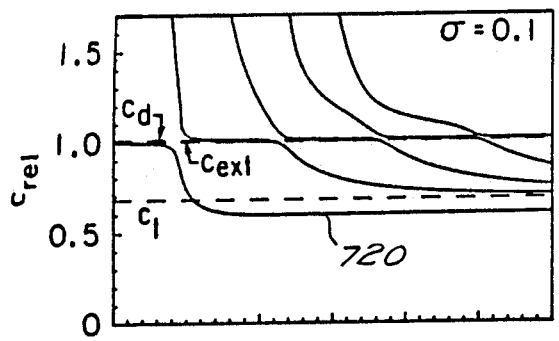
FIGS. 12a, 12b, 12c and 12d are plots of longitudinal mode dispersion curves for values of Poisson's ratio of 0.1, 0 2, 0.3 and 0.4, rspectively.
Figure 12B:
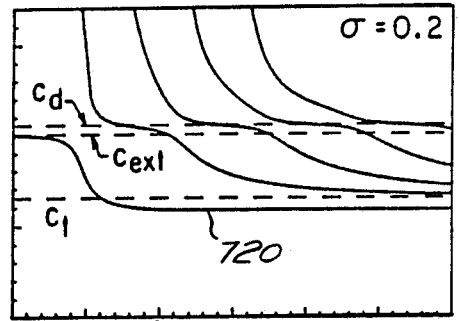
Figure 12C:
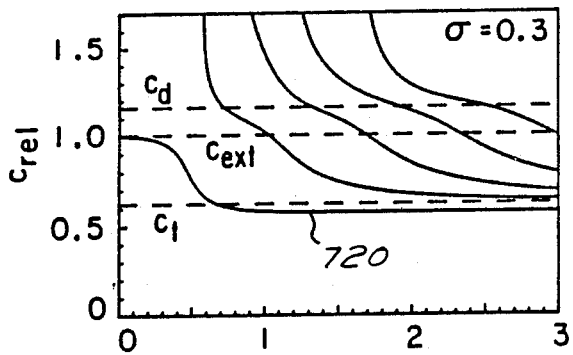
Figure 12D:
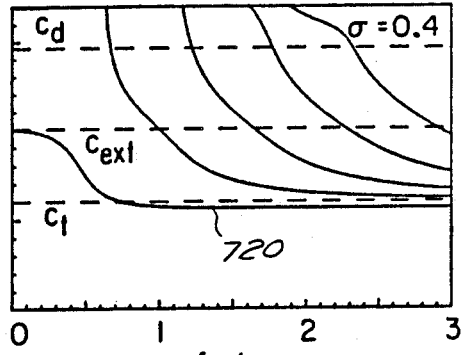

The general solutions of the acoustic wave equations in solid, circular rods consisting of isotropic, homogeneous material are set forth below. The cylindrical coordinate system being used is shown in FIG. 11. For purposes of analysis, the rod is assumed to have a diameter of $2a$ and an infinite length.

Solving the wave equation in cylindrical coordinates according to FIG. 11, the general displacement distribution given by $u_r$, $u_\phi$ and $u_z$ can be shown to be $$u_r = U(r) \begin{bmatrix} \sin(n\phi) \\ \cos(n\phi) \end{bmatrix} e^{i(\omega t - k_0 z)} \quad (10)$$

$$u_\phi = V(r) \begin{bmatrix} \cos(n\phi) \\ -\sin(n\phi) \end{bmatrix} e^{i(\omega t - k_0 z)}$$

$$u_z = W(r) \begin{bmatrix} \sin(n\phi) \\ \cos(n\phi) \end{bmatrix} e^{i(\omega t - k_0 z)}$$

Here, $\omega$ is the angular frequency, $k_0$ is the acoustic wave propagation constant in the z direction and n is an integer describing the circumferential field variation. Either the lower set or the upper set of trigonometric functions is to be used. The radial variations are given by:

$$U(r) = A k_d J_n'(k_d r) + B k_0 J_n'(k_t r) + C \frac{n}{r} J_n(k_t r) \quad (11)$$

$$V(r) = A \frac{n}{r} J_n(k_d r) + B \frac{k_0 n}{k_t r} J_n(k_t r) + C k_t J_n'(k_t r)$$

$$W(r) = -i[A k_0 J_n(k_d r) - B k_t J_n(k_t r)]$$

Here, $J_n$ is the Bessel function of the first kind and of order n, $J_n'$ denotes its derivative with respect to the argument, and $k_d$ and $k_t$ are given by $$k_d^2 = (\omega^2/c_d^2) - k_0^2$$

$$k_t^2 = (\omega^2/c_t^2) - k_0^2 \quad (12)$$

where the bulk dilatational and transverse wave velocities $c_d$ and $c_t$, respectively, are defined in terms of the density $\rho$ of the fiber and Lame's constants $\lambda$ and $\mu$ as:

$$c_d^2 = (\lambda + 2\mu)/\rho$$

$$c_t^2 = \mu/\rho \quad (13)$$

Requiring the three components $T_{rr}$, $T_{rz}$ and $T_{r\phi}$ of the stress tensor to be zero for $r=a$ yields the dispersion relation which determines $k_0$ as well as the relative magnitudes of the constants A, B and C. These constants can be normalized by imposing suitable requirements.

First consider the longitudinal modes, i.e., the modes which are axially symmetric with the cylinder and have no circumferential movement. This is obtained by choosing $n=0$ and using the lower set of trigonometric functions in Equation (10), where C, being decoupled from A and B for $n=0$, is set independently to zero. Introducing the "normalized" wave numbers $q_t = k_t a$, $q_d = k_d a$ and $q_0 = k_0 a$, the following two equations in A and B are obtained:

$$\begin{bmatrix} -\frac{1}{2}(q_t^2 - q_0^2)J_0(q_d) + q_d J_2(q_d) & -q_0\{q_t J_0(q_t) - J_1(q_t)\} \\ 2q_0 q_d J_1(q_d) & -(q_t^2 - q_0^2)J_1(q_t) \end{bmatrix} \begin{bmatrix} A \\ B \end{bmatrix} = 0 \quad (14)$$

The dispersion relation is obtained by requiring the determinant of these equations to be zero. Having solved this problem, the relation between A and B can be found by applying one of the equations in (14).

In solving these equations, it has been found convenient to normalize the wave velocity c to $c_{ext} = (Y/\rho)^{\frac{1}{2}}$, which is the velocity of the fundamental longitudinal mode in the low frequency limit as given by Young's modulus $Y = \mu(2\mu + 3\lambda)/(\mu + \lambda)$. Thus, the relative velocity, $c_{rel}$ is defined as:

$$c_{rel} = c/c_{ext} \quad (15)$$

To obtain universal curves, the dimensionless parameter $fa/c_t$ is chosen as the independent variable where $f = \omega/2\pi$. In this way, it is easy to study the acoustic wave propagation parameters as a function of the acoustic wave frequency for a given dimension of the cylinder. Furthermore, with respect to the present invention, the variation of the propagation parameters with varying rod radius for a given frequency can also be obtained.

Numerically calculated dispersion curves for longitudinal modes are shown in FIGS. 12a, 12b, 12c and 12d for four values of Poisson's ratio $\sigma$ used as a parameter. FIGS. 12a, 12b, 12c and 12d are plots of these longitudinal mode dispersion curves for values of Poisson's aatio equal to 0.1, 0.2, 0.3 and 0.4, respectively. For reference, $\sigma = \lambda/2(\mu + \lambda)$ has been varied over the range of practical interest, and the five lowest order propagation modes are shown for each of these four values of $\sigma$. Only the lowest mode 720 extends to the lowest $fa/c_t$ values. Since the present invention functions in this range, the lowest mode is of particular interest. Therefore, only this mode is discussed in detail hereinafter.

Figure 13:
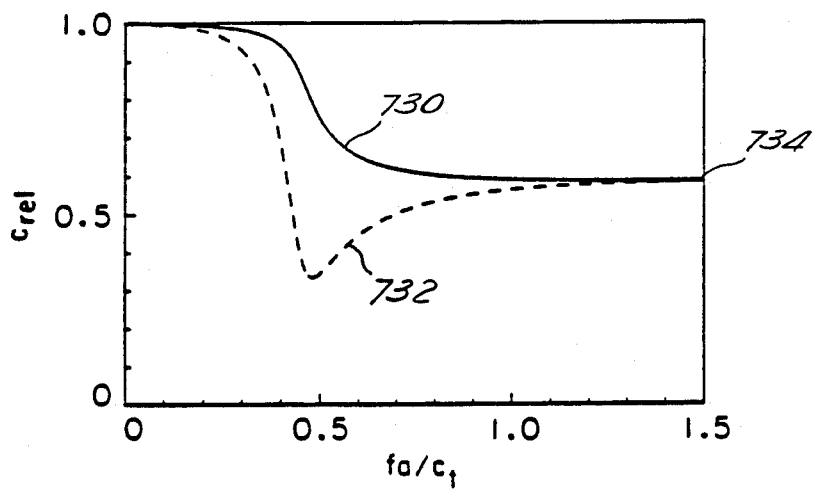
FIG. 13 is a plot of longitudinal mode group and phase velocity in fused silica as a function of $fa/c_t$.

The calculated phase velocity as a function of $fa/c_t$ is shown in more detail in FIG. 13 by a line graph 730 for fused silica which has the following characteristics: $\rho = 2.20 \cdot 10^3 \text{kg/m}^3$, $c_{ext} = 5760 \text{m/sec}$, $c_t = 3764 \text{m/sec}$, $\sigma = 0.17$. The group velocity is given by:

$$c_g = \frac{c}{1 - \frac{\omega}{c} \frac{\partial c}{\partial \omega}} \quad (16)$$

A plot of $c_g$ is shown in FIG. 13 as the curve 732.

Figure 14A:
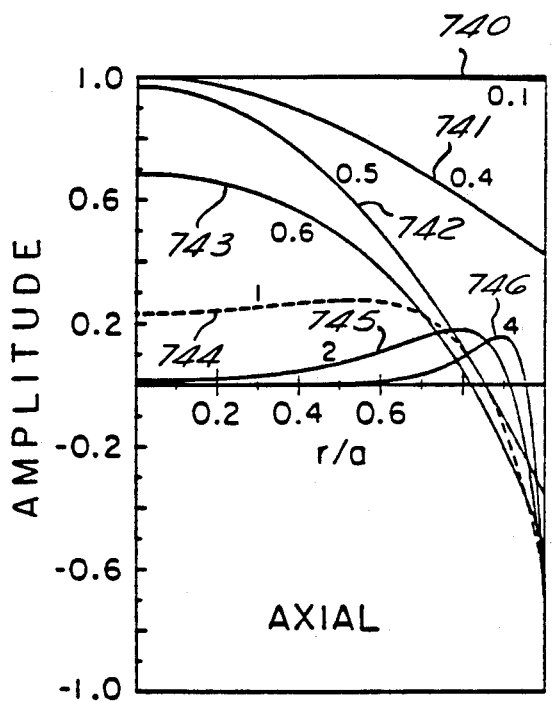
FIGS. 14a and 14b are graphs of longitudinal mode characteristics in a cylinder in terms of the cylinder radius with $fa/c_t$ as a parameter for axial and radial displacements, respectively.
Figure 14B:
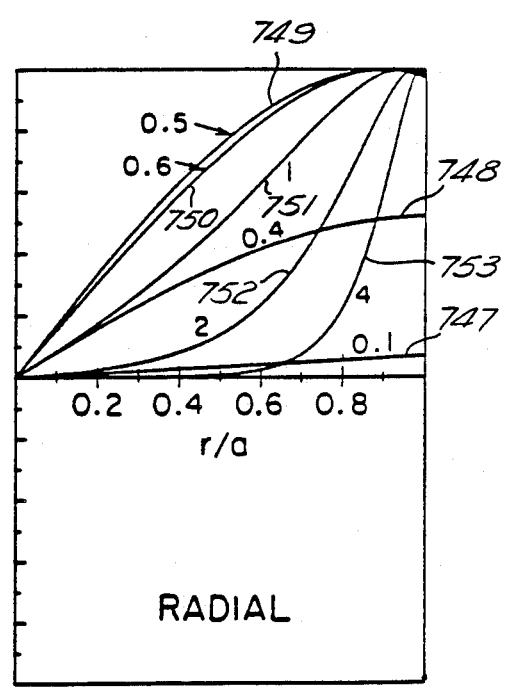

Applying Equations (10), (11) and (14) to the fused silica characteristics, the amplitude distributions of the acoustic wave modes can be obtained. Numerical calculations of the amplitude distributions for fused silica are shown in FIGS. 14a and 14b where $fa/c_t$ has been used as a parameter. The axial (FIG. 14a) and radial (FIG. 14b) amplitude distributions for the lowest longitudinal mode are shown as functions of the normalized cylinder radius, $r/a$, for seven values of the parameter $fa/c_t$ equal to 0.1, (curves 740 and 747) 0.4 (curves 741 and 748), 0.5 (curves 742 and 749), 0.6 (curves 743 and 750), 1 (curves 744 and 751), 2 (curves 745 and 752) and 4 (curves 746 and 753). Normalization has been performed by requiring that for each value of the parameter $fa/c_t$, the maximum displacement component shall be unity.

From line graph 730 in FIG. 13, it is clear that the phase velocity 730 for a small rod radius (i.e., for a small vaue of $fa/c_t$) approaches that of a slender bar as given by Young's modulus, i.e., $c_{rel}=1.0$. FIGS. 14a and 14b show that the displacement for a small rod radius approaches a purely longitudinal movement. This is illustrated in FIGS. 14a and 14b by the axial and radial displacement curves 740 and 747, respectively, corresponding to a value of 0.1 for the parameter $fa/c_t$. Comparing these axial and radial displacement amplitudes, it is clear that the axial amplitude represented by the curve 740 is much greater than the radial amplitude represented by the curve 747 and is also nearly uniform over the entire radius of the rod.

As $fa/c_t$ increases to values large compared to unity, the velocity approaches the velocity of surface waves. This is illustrated at location 734 on the curves 730 and 732 in FIG. 13 for values of $fa/c_t$ between 1.0 and 1.5. The displacement pattern asymptotically approaches that of surface waves in which case the energy is confined basically to a thin surface layer about one wavelength in thickness. FIGS. 14a and 14b graphically represent the surface wave characteristics in terms of the displacement amplitudes for large values of $fa/c_t$. Examination and comparison of the axial and radial displacement amplitude curves, 746 and 753, respectively, for $fa/c_t$ equals 4 reveals features that are characteristic of surface waves. First, both the axial and radial displacements are approximately zero for the interior regions of the cylinder (e.g., for $r/a$ less than about 0.6). Second, the radial displacement, 753, is much larger near the surface of the rod, (e.g., $r/a \simeq 0.7$), than the axial displacement 746 in the same radial region. (Note: Negative amplitudes are 180° out of phase with the driving source.)

A comparison of FIGS. 14a and 14b shows that a rod with a gradually varying radius will transform a longitudinal mode propagating in a rod section having a small radius into modes approaching surface waves in a rod section having a larger radius. If this tapering of the rod radius is gradual enough, the change in mode pattern from longitudinal to surface will be without noticeable loss due to mode conversion. In other words, transformation from one mode pattern to the other will occur adiabatically. This transition of the propagation mode from a predominantly longitudinal mode to a predominantly surface wave mode as the rod radius becomes progressively larger is shown in FIGS. 14a and 14b. Examination of the series of curves 740 through 746 of the axial displacement amplitudes reveals that as the radius goes from small values, (e.g., $fa/c_t=0.1$ represented by the curve 740), to larger values, (e.g., $fa/c_t=4$ represented by the curve 746), the relative displacement goes from a uniform (i.e., virtually constant) value of approximately 1.0 as a function of $r/a$ to a distribution which is virtually zero up to values of $r/a=0.6$ and a peak of a relatively small amplitude of approximately 0.18. Emphasis is put on the relative magnitudes of the two curves as well as the concentration of the $fa/c_t=4$ amplitude curve 746 near the surface of the rod, (i.e., $r/a$ approximately equal to 0.9). In contrast, a similar comparison of the radial amplitude distributions as a function of $r/a$, shown in FIG. 14b, shows that the $fa/c_t=0.1$ curve 747 is considerably reduced in magnitude to approximately 0.1 while the $fa/c_t=4$ curve 753 is nearly zero from the center of the rod, $r/a=0$ to $r/a=0.6$ and then increases rapidly to a value of approximately 1.0 for $r/a=1$, a position corresponding to the surface of the rod. In summary, curves 740 and 747 illustrate a longitudinal wave, i.e., a predominantly axial displacement which is uniform as a function of position along the rod radius, for the small values of $fa/c_t=0.1$. For the large value of $fa/c_t=4$, curves 746 and 753 illustrate a surface wave, i.e., a predominantly radial displacement which is concentrated near the surface of the rod, e.g., $r/a > 0.8$. The plots of axial and radial displacement for intermediate values of $fa/c_t$ between 0.1 and 4 show the gradual transition from longitudinal mode to surface wave mode as the rod radius increases. Thus, it is seen that a longitudinal wave excited at the small diameter end of the tapered rod is transformed into a mostly surface-like-wave at the large diameter end of the tapered rod for appropriately selected diameters. By reciprocity, a surface-wave-like wave excited uniformly around the rim at the larger end of the rod is transformed into a mostly longitudinal displacement at the other end if the rod radius is made sufficiently small. This longitudinal displacement pattern is well suited to exciting flexural waves in an optical fiber connected to the small end of the rod.

The acoustic horn 704 of FIG. 10a constructed from a solid cylindrical section of glass rod has been shown to exhibit the characteristics just described. That is, surface waves excited in the large diameter end 706 of the tapered horn 704 were transformed into longitudinal waves at the small diameter end 702. This horn 704 has been used to excite flexural acoustic waves in an optical fiber by attaching the small end to the fiber as shown in FIGS. 8 and 10a.

Figure 10B:
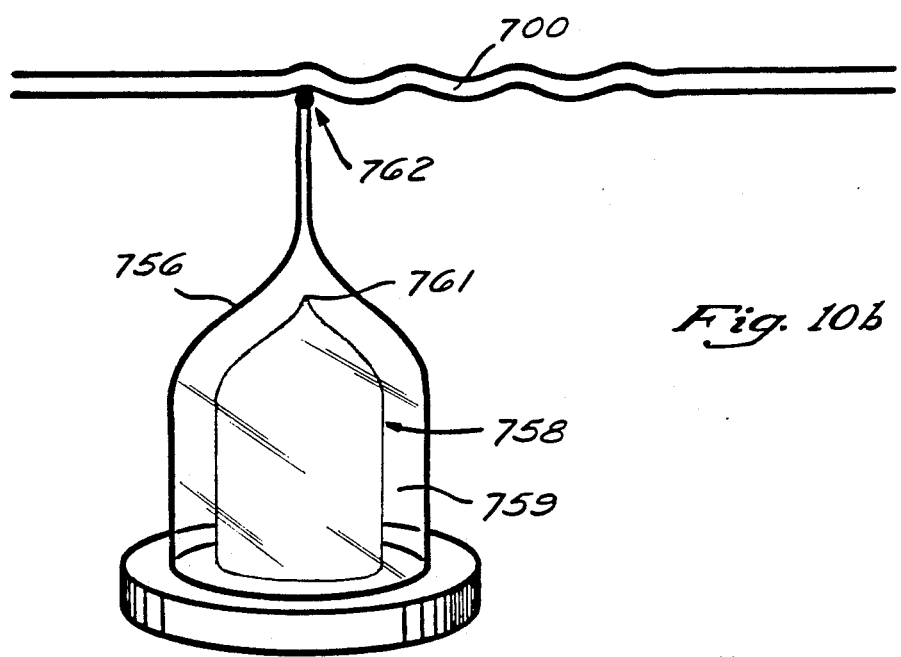
FIG. 10b is an illustration of an alternative embodiment of the present invention showing an acoustic horn with a cavity for suppressing bulk acoustic waves.

The acoustic horn 704, described above, performs well; however, in addition to the desired primary longitudinal mode, resonant modes were also observed at the small end 702 of the horn 704. These resonant modes can be suppressed by drawing the horn from a silica glass tube such that the horn is hollow in the center from the large diameter base to the neck at the end of the transition region. FIG. 10b illustrates a hollow acoustic horn 756 having a hollow region 758 in a base 759. The hollow region 758 of the horn 756 terminates in a neck portion 761. The neck portion terminates on a small end 762. The small end 762 is connected to the optical fiber 700 as discussed above. The hollow region 758 suppresses the resonant modes in the horn 756. Suppression of the resonant mode can be further enhanced by filling the hollow region 758 with acoustic damping material.

The horns of FIGS. 10a and 10b have successfully launched flexural acoustic waves with amplitudes of tens of nanometers onto the optical fiber 700.

The foregoing discussion relates to the propagation of longitudinal mode acoustic waves in a cylinder and how such modes are useful in the construction of an acoustic horn. Other modes of propagation can exist in a cylindrical rod. Using Equations (10) and (11), one can see that by maintaining n=0 and using the upper set of trigonometric functions in Equation (10), one can mathematically describe circumferential displacement. In this case, A and B can be set equal to zero independently, thus giving a purely circumferential displacement. The dispersion relation is obtained by requiring the component $T_{r\phi}$ of the stress tensor to be zero for r=a which yields:

$$q_t J_0(q_t) - 2J_1(q_t) = 0 \qquad (17)$$

where $q_t = k_t a$ as before. This equation has one root, $q_t = 0$, as well as an infinite set of roots different from zero. The special case $q_t = 0$ yields a solution $c = c_t$ that is nondispersive. This lowest mode propagates with the shear wave velocity and has a displacement distribution given by:

$$u_\phi = C_1 r e^{-ik_0 z} \qquad (18)$$

The other solutions correspond to displacements as found from Equation (11), i.e., $$u_\phi = C_1 J_1(k_t r) e^{-ik_0 z} \qquad (19)$$

Dispersion relations for the higher modes can be found by solving Equation (17) for values of $q_t$ other than zero. Once $q_t$ is found, $k_o = \omega/c$ can be substituted in Equation (12) to obtain $$c/c_t = [1 - (q_t c_t/\omega a)^2]^{-\frac{1}{2}} \qquad (20)$$

Figure 15:
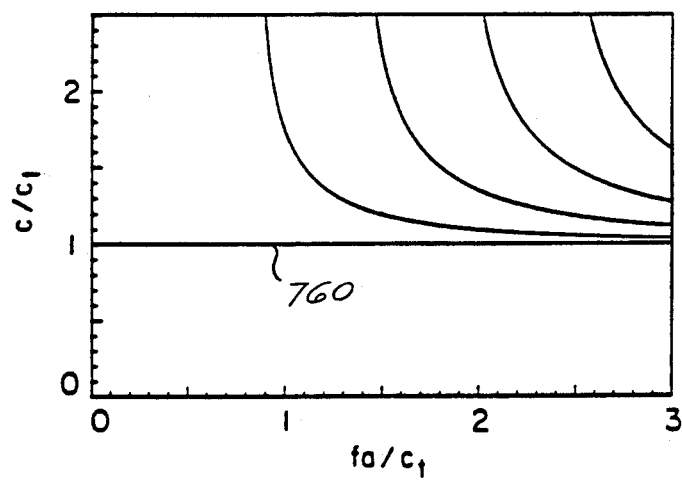
FIG. 15 is a graph of phase velocity as a function of $fa/c_t$ for the five lowest circumferential modes of a cylindrical rod.

Thus, the relative velocities of the higher modes are expressed analytically by $q_t$ and $fa/c_t$. Calculated universal curves are shown in FIG. 15. Only the lowest mode 760 propagates for low $fa/c_t$ values. The circumferential displacement of this dispersion-free mode varies proportionally with the radial distance.

A third group of modes called flexural waves which are of particular interest in the context of the features of the present invention related to the frequency shifting of light in an optical fiber, is obtained by putting an integer $n \neq 0$ in Equation (11). In this displacement components are present, and the boundary conditions of a stress-free surface leads to a dispersion relation that can be written in determinant form as:

$$\begin{vmatrix} n^2 - 1 - q_0^2(x^2 - 1)n^2 - 1 - q_0^2(2x - 1)2(n^2 - 1)[\gamma_n(q_t) - n] & -q_0^2(2x - 1) \\ \gamma_n(q_d) - n - 1\ \gamma_n(q_t) - n - 1\ 2n^2 - 2[\gamma_n(q_t) - n] & -q_0^2(2x - 1) \\ \gamma_n(q_d) - n - (x - 1)[\gamma_n(q_t) - n]\ n^2 & \end{vmatrix} = 0 \qquad (21)$$

In Equation 21, $\gamma_n(q) = q\ J_{n-1}(q)/J_n(q)$ and $x = c^2/2c_t^2$. From these calculations, the relative magnitudes of the constants A, B and C from Equation (11) can be determined, as before. The choice of the upper or lower set of trigonometric functions in Equation (10) differs only in the choice of direction of the x-axis and y-axis in FIG. 11.

FIGS. 16a-d show dispersion curves for the first five flexural wave modes when n is chosen to have its lowest possible value, n=1. Analogous to the dispersion curves for the longitudinal modes previously discussed in relation to FIGS. 12a-d, FIGS. 16a, 16b, 16c and 16d are plots of the flexural mode dispersion curves representing the lowest order modes for values of Poisson's ratio, $\sigma$, equal to 0.1, 0.2, 0.3 and 0.4, respectively. As was seen for the other mode groups, i.e., longitudinal and circumferential, only the lowest mode 770 is propagated for very low values of $fa/c_t$, as illustrated in FIGS. 16a-d. Additionally, FIGS. 16a-d show that the phase velocity of the lowest mode goes uniformly to zero approximately as $(fa/c_t)^{\frac{1}{2}}$ for small values of this parameter, while for large values of $fa/c_t$, the phase velocity of the lowest mode approaches the surface-wave velocity of a plane surface. The other higher order modes, 772, 774, 776 and 778, likewise approach the transverse wave velocity $c_t$ for high $fa/c_t$ values.

If n is larger than 1, we obtain yet higher order flexural modes. An example is shown in FIGS. 17a, 17b, 17c and 17d where n=2 has been considered for Poisson's ratio of 0.1, 0.2, 0.3 and 0.4, respectively. FIGS. 17a-d demonstrate that all modes are cut off at low $fa/c_t$ values and that for large $fa/c_t$, the lowest mode approaches the surface wave velocity while the other modes approach the transverse wave velocity $c_t$. These properties are typical of flexural modes with n larger than 1.

Figure 18:
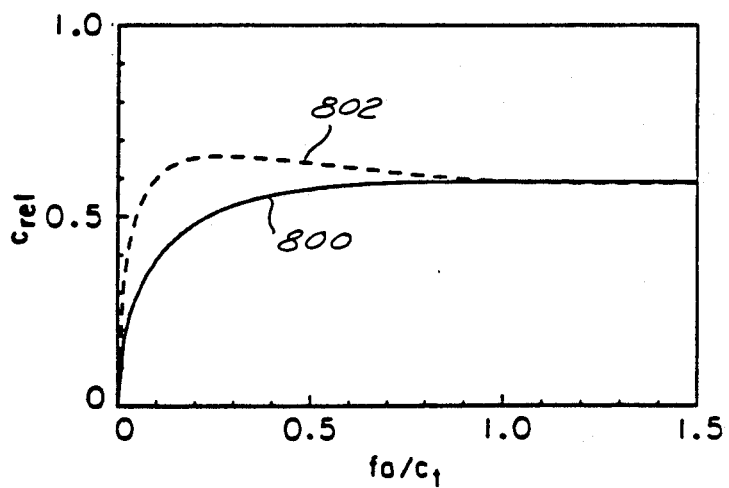
FIG. 18 is a graph of the calculated phase velocity (solid lines) and the group velocity (dashed line) as a function of the cylinder radius with $fa/c_t$ as a parameter for the lowest order flexural mode in fused silica.
Figure 16A:
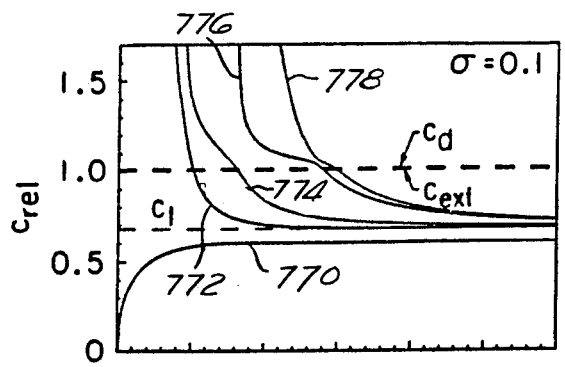
FIGS. 16a, 16b, 16c and 16d are graphs of dispersion curves for the first five flexural wave modes in a cylinder for Poisson's ratio of 0.1, 0.2, 0.3 and 0.4, respectively.
Figure 16B:
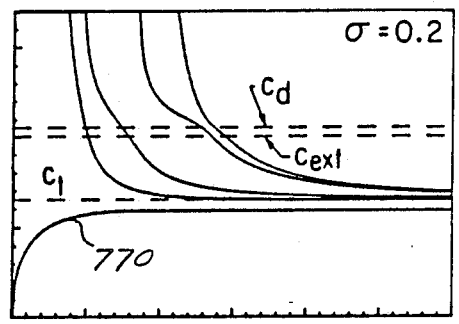
Figure 16C:
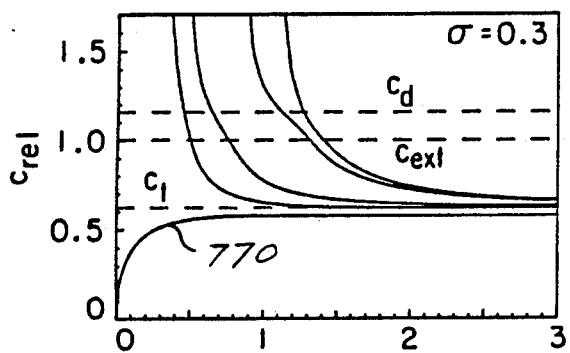
Figure 16D:
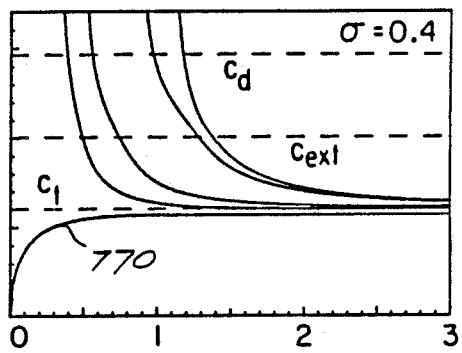
Figure 17A:
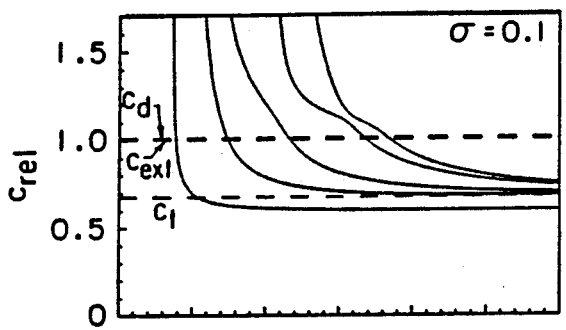
FIGS. 17a, 17b, 17c and 17d are graphs of phase velocity versus $fa/c_t$ for flexural waves where the mode number n is equal to 2 for Poisson's ratio of 0.1, 0.2, 0.3 and 0.4, respectively.
Figure 17B:
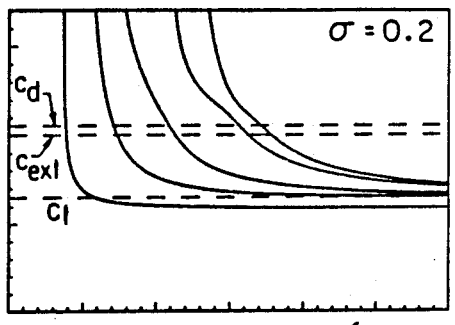
Figure 17C:
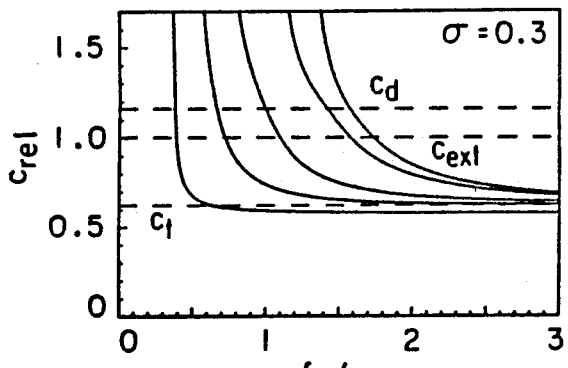
Figure 17D:
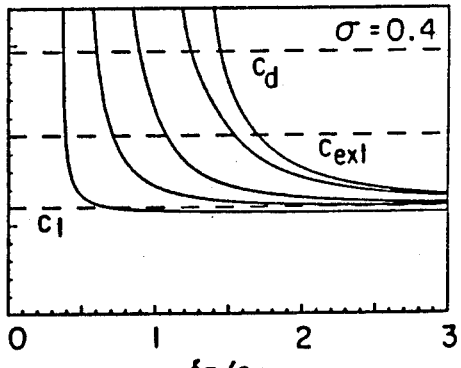

FIG. 18 shows a graph 800 of the calculated phase velocity and a graph 802 of the group velocity for the lowest mode of the n=1 group for fused silica.

Figures 19A, 19B, 19C:
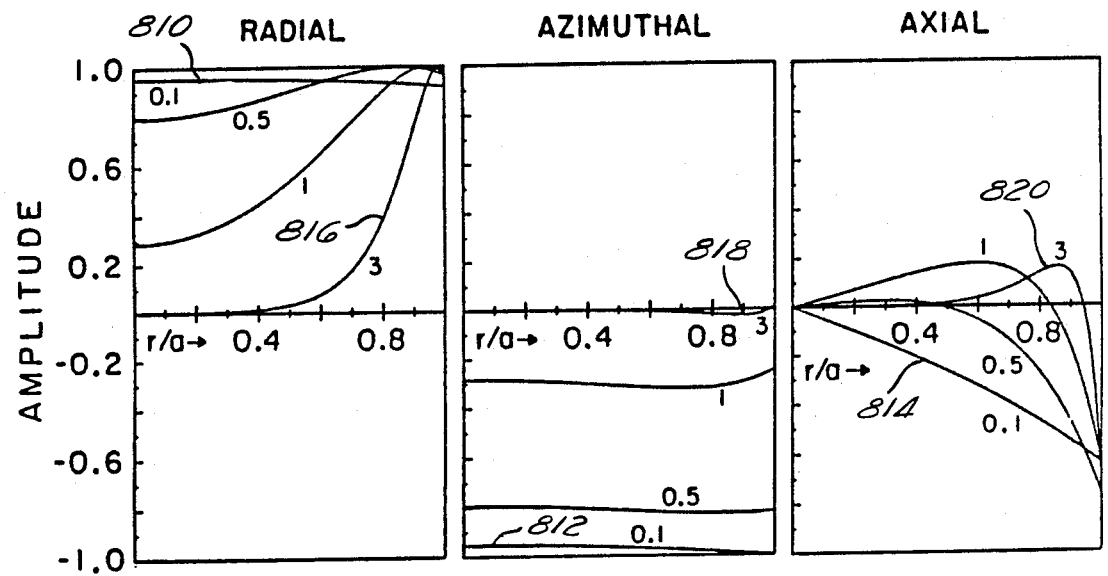
FIGS. 19a, 19b and 19c are graphs illustrating the flexural wave mode pattern variation as a function of the $fa/c_t$ parameter in the radial, azimuthal and axial directions, respectively.

FIGS. 19a, 19b and 19c show the flexural wave mode pattern variation as a function of the $fa/c_t$ parameter, similar to the wave pattern amplitude distribution for longitudinal waves shown in previously discussed FIGS. 14a and 14b. FIGS. 19a, 19b and 19c illustrate the displacement amplitude distributions of the lowest order flexural mode in the radial, azimuthal and axial directions, respectively. The four curves in each plot represent values of the parameter $fa/c_t$ equal to 0.1, 0.5, 1 and 3, respectively. The calculations represented by FIGS. 19a, 19b and 19c show that in the limit of small $fa/c_t$, e.g., for $fa/c_t = 0.1$, that the radial, azimuthal and axial amplitude distributions, shown as curves 810, 812 and 814, respectively, approach a purely transverse displacement. Similarly, for higher values of $fa/c_t$, e.g., $fa/c_t = 3$, the radial, azimuthal and axial amplitude distributions, shown as curves 816, 818 and 820, respectively, approach a displacement corresponding to a surface wave distribution. It should be noted that as opposed to the lowest longitudinal mode, this mode is modulated by a sine function in the circumferential direction.

Power Relations

In an optical fiber, the lowest flexural mode is of special interest for the acousto-optic interaction. At the thin end of the rod, only the lowest of the longitudinal modes is presently used for excitatin of the flexural mode in the fiber. Nevertheless, both the lowest flexural as well as the lowest torsional mode can be used for this purpose. Therefore, in determining the relations between the rod radius and the acoustic amplitude for a given power, all three modes will be considered. The relationship of the coupling strength between the two optical modes coupled by a flexural wave traveling in the fiber and the fiber radius will also be discussed.

The (time averaged) energy density E of a traveling wave having displacement components given by Equation (10) is equal to the sum of the peak kinetic energy densities for each displacement component, i.e., $$E = \tfrac{1}{2}\rho\omega^2\{|u_r|^2 + |u_\phi|^2 + |u_z|^2\} \quad (22)$$

The power P flowing through the fiber cross section S is given by:

$$P = c_g \int_S E \, dS \quad (23)$$

In Equation (23), $c_g$ represents the group velocity of the travelling wave. Combining Equations (22) and (23), the power flow can be expressed in terms of the temporal peak displacement components, i.e., $$P = \quad (24)$$

$$2\pi^2 \rho c_g c_t^2 (fa/c_t)^2 \int_0^{2\pi} \int_0^1 \{|u_r|^2 + |u_\phi|^2 + |u_z|^2\} R \, dR \, d\phi$$

where the normalized radius $R = r/a$ has been introduced. The constants on the right-hand side of this equation can be varied through a variation of the parameter $fa/c_t$. This establishes a universal relation between the displacement and the transmitted power in terms of $fa/c_t$. As shown in FIGS. 14 and 19, distribution and relative magnitudes of the displacement components vary considerably when $fa/c_t$ is varied. Accordingly, there may be several choices from among the variables f, a, $c_t$ and combinations thereof, in selecting one particular quantity for describing these amplitude plots. The spatial maximum value of any of the three displacement components, i.e., radial, azimuthal and axial, for a given cross-section and mode has been selected to represent the displacement for that mode. The amplitude curves in FIG. 20 were calculated following this selection procedure. The maximum amplitude as a function of $fa/c_t$ for the three lowest modes in fused silica, longitudinal, torsional and flexural represented by curves 840, 842 and 846, respectively, are plotted in FIG. 20. These curves all follow the same general trend wherein the amplitude is larger for small values of $fa/c_t$ than for larger values of $fa/c_t$.

Figure 20:
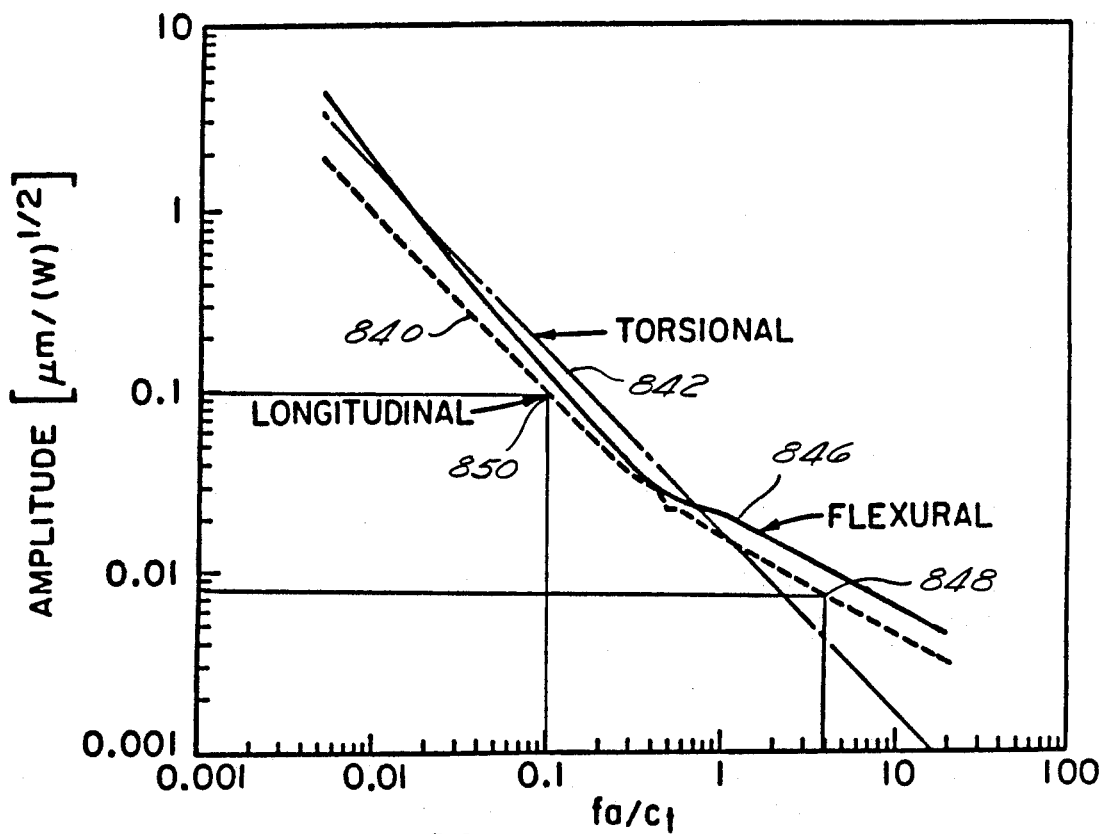
FIG. 20 is a graph of the maximum displacement amplitude as a function of $fa/c_t$ for the three lowest modes in fused silica showing the graph for the flexural mode as a solid line, the graph for the longitudinal mode as a dashed line and the graph for the torsional mode as a phantom line.

The curves in FIG. 20 can be used to determine the variation in amplitude of an acoustic wave traveling through a tapered rod, such as the rod 704 shown in FIG. 10a. By way of example, suppose that the acoustic transducer 708 is attached to the tapered glass rod 704 at a location having a diameter corresponding to $fa/c_t = 4.0$. A longitudinal wave excited into the rod at this point would have an amplitude of approximately 0.008 μm/W$^{\frac{1}{2}}$, shown at 848 in FIG. 20. At a location on the tapered rod having a diameter such that $fa/c_t = 0.1$, the amplitude would be approximately 0.1 μm/W$^{\frac{1}{2}}$, shown at 850. If the taper is smooth so that no wave energy is lost between the two points, it is seen that the amplitude at the smaller diameter is approximately $0.1/0.008 = 12.5$ times greater than the amplitude excited in the rod at the larger diameter. This rod would thus have an amplitude transformer ratio of 12.5. The transformer ratio is the ratio of the amplitude at the larger diameter to the amplitude at the smaller end of the tapered rod. The longitudinal mode is of most interest for this purpose, but the other two modes have been included for reference.

Consider now the efficiency for coupling light between two modes of an optical fiber via an interaction with an acoustic wave propagating in the same fiber. It can be shown that in a two-mode optical fiber, flexural acoustic waves will couple one mode to the other with 100% efficiency over a length $L_c$ given by $$L_c = \frac{\pi}{2} L_B \frac{a_c}{u_t} \cdot \frac{1}{C_1} \quad (25)$$

In Equation (25), $L_c$ is the coupling length and $u_t$ is the transverse amplitude. For an actual two-mode fiber the following data are given when the normalized frequency $V = 3.03$:

$L_b$ (optical fiber beat length) = 265 μm.
$a_c$ (optical fiber core radius) = 2.3 μm
$C_1$ (constant) = 0.908
a (fiber radius) = 42.5 μm.

The normalized frequency V is defined to be $2\pi a_c (n_c^2 - n_{cl}^2)^{\frac{1}{2}}/\lambda$ where $a_c$ is the fiber core radius, $n_c$ and $n_{cl}$ are the indices of refraction of the core and cladding, respectively, and $\lambda$ is the optical wavelength. Since the core radius is small compared to the fiber radius, $u_t$ may be equated to the value of $|u_r|$ (or $|u_\phi|$). for $r = 0$. By means of Equation (24), the relation between the acoustic input power and the optical coupling length is thus obtained. Besides the obvious dependence on power input, the variation of coupling length as a function of the fiber radius can also be obtained from these relationships.

Defining the acousto-optic coupling efficiency as $k_e = C_1 \mu_t (a_c \sqrt{P})$, Equation (25) can be rewritten as $$L_c = \frac{\pi}{2} L_b \cdot \frac{1}{\sqrt{P}} \cdot \frac{1}{k_e} \quad (26)$$

Figure 21A:
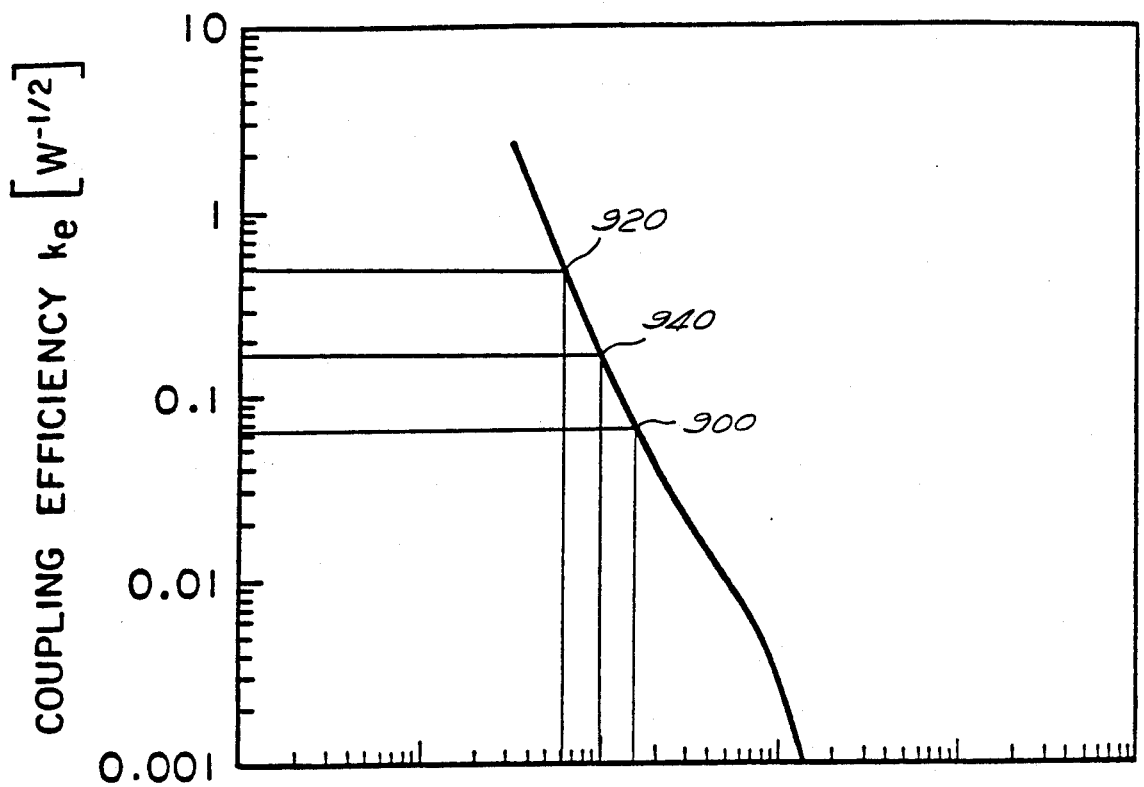
FIG. 21a is a graph of the coupling efficiency $k_e$ as a function of $a/L_b$ for the coupling of light from one mode into the other mode through interaction with a traveling acoustic wave propagating in the fiber.

For the specific core properties given above for $V = 3.03$, $k_e$ has been plotted as a function of fiber radius normalized to the fiber beat length in FIG. 21a. For other core parameters, $k_e$ can be calculated by scaling according to its definition as given above.

The optical fiber has a core and cladding for the purpose of light guidance. In an exemplary two-mode fiber, this central core is 2.3 μm in radius while the total fiber radius is 42.5 μm. When the acoustic energy is transmitted through the optical fiber in the flexural wave mode, the acoustic energy will be distributed throughout the entire 42.5 μm radius of the fiber and is not confined to the central core. Since the central core is considerably smaller than the overall radius of the fiber, the model describing the propagation of the flexural waves through the optical fiber may be that of an homogeneous rod. The previous solution of the wave equation in cylindrical coordinates for the flexural modes in solid circular rods comprised of isotropic homogeneous material yields the results presented in FIGS. 21a and 21b. FIG. 21a illustrates the coupling efficiency, $k_e$, for the coupling of light traveling in one mode into the other mode through interaction with a traveling flexural acoustic wave propagating in the fiber. For constant core properties, i.e., a constant beat length $L_b$, FIG. 21a shows that the coupling efficiency for a given input power can be increased considerably by reducing the outer radius, $a_O$, of the fiber. For low values of $a/L_b$, $k_e$ is proportional to $(a/L_b)^{-2.5}$.

Reducing the outer radius of the fiber creates a decrease in the phase velocity of the flexural acoustic wave propagating in the fiber. If the frequency of the acoustic signal is fixed, this decrease in phase velocity creates a corresponding decrease in the acoustic wave length within portions of the fiber having relatively smaller radii.

The beat length of the fiber is determined by the properties of the central core. Therefore, reducing the radius of the fiber by removing only the outer cladding portion does not alter the beat length of the fiber.

Figure 21B:
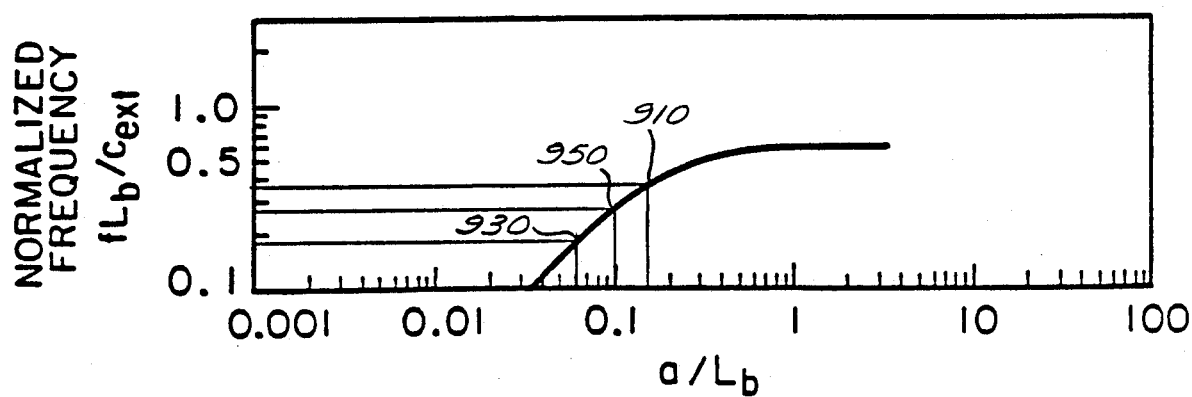
FIG. 21b is a graph of the normalized frequency (synchronous frequency) $fL_b/C_{ext}$ as a function of $a/L_b$.

Since substantial cumulative coupling of the optical signal between the two propagation modes of the fiber only occurs when the acoustic wave length is substantially equal to the beat length of the fiber, the acoustic frequency must be decreased accordingly in order to maintain an acoustic wave length which is substantially equal to this beat length. This relationship between the frequency of the acoustic wave, $f_A$, defined as the synchronous frequency, normalized to the beat length ($L_b$) and the extensional velocity ($c_{ext}=(Y/\rho)^{\frac{1}{2}}$, where Y is Young's modulus and $\rho$ is the density of the fiber) is illustrated in FIG. 21b. The synchronous frequency $f_A$ is linearly proportional to the radius for small values of the normalized radius $a/L_b$.

For an exemplary fused silica two-mode fiber, typical values of the extensional velocity ($c_{ext}$), beat length ($L_b$), core radius ($a_c$) and fiber radius ($a_O$), are:

$c_{ext}$=5760 $\mu$m/sec
$L_b$=265 $\mu$m
$a_c$=2.3 $\mu$m
$A_O$=42.5 $\mu$m

Using these numbers, it is seen that at the location labelled 900 on FIG. 21a, for a fiber radius a=42.5 $\mu$m, the coupling efficiency is approximately 0.071 $W^{-\frac{1}{2}}$ and that at location 910 on FIG. 21b that an acoustic frequency $f_A$ of approximately 8 MHz produces an acoustic wave in the fiber with a wave length approximately equal to the fiber beat length of 265 $\mu$m.

Assuming the fiber outer radius is etched or otherwise reduced to approximately 16 $\mu$m, it is seen from FIG. 21a that at the location marked 920 the coupling efficiency increases to approximately 0.5 $W^{-\frac{1}{2}}$, about seven times greater than the coupling efficiency of the unetched fiber with a radius of 42.5 $\mu$m. The curve of FIG. 21b shows that the acoustic frequency which produces an acoustic wave with a wave length equal to the fiber beat length is approximately 4.0 MHz, illustrated at the location 930.

Similarly, for a fiber radius of approximately 26.5 $\mu$m, FIG. 21a shows a coupling efficiency of approximately 0.17 $W^{-\frac{1}{2}}$ at a location 940 and FIG. 21b shows that an acoustic frequency of approximately 6.0 MHz will produce an acoustic wave length equal to the beat length of the fiber, 265 $\mu$m at the location 950.

Thus, it is clearly illustrated in FIGS. 21a and 21b, that the coupling efficiency and synchronous frequency vary with the radius of the fiber. The present invention utilizes these characteristics of multimode fiber to produce a broad band fiber optic frequency shifter. The invention further uses these characteristics to couple the acoustic wave to the fiber without using external dampers to confine the acoustic wave to the coupling region of the fiber.

Coupling of the two optical modes in a two-mode fiber has been shown to be efficient when performed with a flexural acoustic wave propagating along the fiber. The present scheme of excitation of the flexural wave requires the acoustic energy to be propagated from a piezoelectric transducer through a tapered cylindrical rod. The mode at the thin end of the rod has been chosen to be longitudinal for the present invention although both flexural and torsional modes may advantageously be used. Therefore, a relatively broad presentation of all mode types has been presented, because the mode shapes change substantially over the parameter range of interest.

Calculations have shown that by reducing the fiber radius and keeping the core radius constant, the coupling length can be reduced substantially for a given acoustic power. This means that the bandwidth of the acousto-optic coupling interaction can be increased by reducing the fiber radius. Alternatively, acoustic power can be reduced if the coupling length is kept constant. As the fiber radius is reduced, the operating frequency is reduced to match the beat length. FIG. 22a illustrates an alternative embodiment of the present invention in which the dampers 336 and 344 shown in FIG. 8 are no longer needed. The acoustic horn 660 couples longitudinal mode acoustic waves to the fiber 662a at the general location indicated by the letter B. A pair of arrows 964, 966, pointing in opposite directions within the fiber portion 672, indicate that flexural acoustic waves are excited in the fiber 662a by the acoustic horn 660 which propagate in both directions along the fiber 662a. The section of optical fiber 662a shown in FIG. 22a is comprised of four portions. The first portion 672 between a location A and a location C is the full radius of the fiber $a_O$. The second portion 674, between a location C and a location D, has been etched to a fiber radius of $a_1$ which is less than $a_0$. The portion 676 between a location D and a location E, has been further etched to fiber radius $a_2$ which is less than $a_1$. A fourth portion 678, between a location E and a location F, has not been etched and has original fiber radius $a_0$. Referring to FIG. 21a, the coupling efficiency in the first portion 672 is less than the coupling efficiency in the second portion 674 which is in turn less than the coupling efficiency in the third portion 676. The fourth portion 678 with radius $a_0$ will have the same coupling efficiency as the first portion 672 since these two portions are the same radius.

Due to the low coupling efficiency in the first portion 672, the flexural acousic wave propagating in the direction of the arrow 966 will cause virtually no acousto-optic coupling between modes when the excitation takes place at the location. Likewise, the flexural acoustic wave propagating in the direction of the arrow 964 will cause virtually no coupling while the flexural acoustic wave is propagating within the first portion 672.

When the flexural acousti wave propagating in the direction 964 reaches the seond portions 674 and the third portion 676, the acoust-optic coupling efficiency increases substantially as shwn in FIG. 21a. The coupling efficiency in the fourth portion 678 will be small compared to that in portons 674 and 676 resulting again in virtually no couplin The advantage of this configuration is that acousticwave dampers are no longer needed along the fiber at th ends of the section CDE because no substantial acousto-optic interaction occurs outside the region of the secon portion 674 and the third portion 676.

A second characteristic of he configuration shown in FIG. 22a is that the acoustic frequency required to produce an acoustic wave whos wave length matches the fiber beat length in the secod portion 674 with fiber radius $a_1$, will be different than the frequency required for matching the beat length n the third portion 676.

This enables the same apparatus to be used for frequency shifting the light by two or more frequencies.

The radius of the fiber in the second portion 674 may be optimized for one frequenc and its length may be selected to achieve 100% couplng at that frequency. To increase the bandwidth of the coupling interaction, the third portion 676 may be optiized in radius and length for a different frequency. Simlarly, adding more regions of fiber with different radii and lengths increases the bandwidth of the frequency shifer accordingly.

A smooth variation of the fiber radius over the total interaction region is illustated in FIG. 22b. In FIG. 22b, the diameter of the fiber 662b gradually varies from a diameter dl at a irst portion 980 where the fiber 662b is coupled to the acustic horn 660 to a second diameter $d_2$ at a location 984 which is smaller than the first diameter $d_1$. As stated erlier, precise matching of the beat length and the acostic wave length is not necessary as long as complet coupling is accomplished within a few beat lengths of he fiber. This minimizes the phase mismatch error crated by the mismatch in acoustic wavelength with the fiber beat length in the coupling region. Therefore, the taper shown in FIG. 22b can be gradual enough so that within a length of fiber wherein 100% coupling occurs, the acoustic wave length does not vary appreciably from the fiber beat length. The configuration of FIG. 22b will allow continuous tuning of the frequency shift between a frequency $F_1$ corresponding to fiber diameter $d_1$ and a frequency $f_2$ corresponding to the fiber diaeter $d_2$.

The optimum angle of the taper, or rate of change of fiber radius as a function of length along the fiber longitudinal axis, may be determined by an empirical process. The process would include measuring the coupling efficiency for a number of different taper angles for a fixed acoustic frequency and selecting the angle which produces the maximum coupling efficiency.

Thus, a broad band fiber optic frequency shifter has been described wherein the frequency shift is tuneable by adjusting the acoustic frequency. Additionally, the frequency shifter is not critically dependent on external dampers for suppression of the undesired optical sidebands created by the counterpropagating acoustic waves.

Alternative Fiber Embodiment Using Elliptical Core Fiber

As previously discussed in reference to the mode selector 640 shown in FIG. 9, only light which is propagating in the second order $LP_{11}$ mode is coupled out of the double-mode fiber 602 into the juxtaposed adjacent single-mode fiber 650 at the interaction region 652. An important criteria in the design of this mode selector is the lobe orientation of the $LP_{11}$ mode as it traverses the coupling region 652. In a circularly symmetric multimode fiber, the $LP_{11}$ modes are actually approximations to the true second order eigenmodes. An exact analysis, however, predicts that the lobe orientation of the $LP_{11}$ modes will rotate about the fiber axis as they travel along the fiber over a distance of several centimeters. The coupling of the double-mode fiber $LP_{11}$ mode to the single-mode fiber $LP_{01}$ mode in the mode selector 640 varies sinusoidally with the $LP_{11}$ mode lobe orientation. This happens because the antisymmetric $LP_{11}$ mode evanescent tail fields must generate symmetric $LP_{01}$ mode fields in the coupled fiber. To have an environmentally stable coupling coefficient between the two fibers, the orientation of the $LP_{11}$ mode lobes must be controlled.

Figure 23:
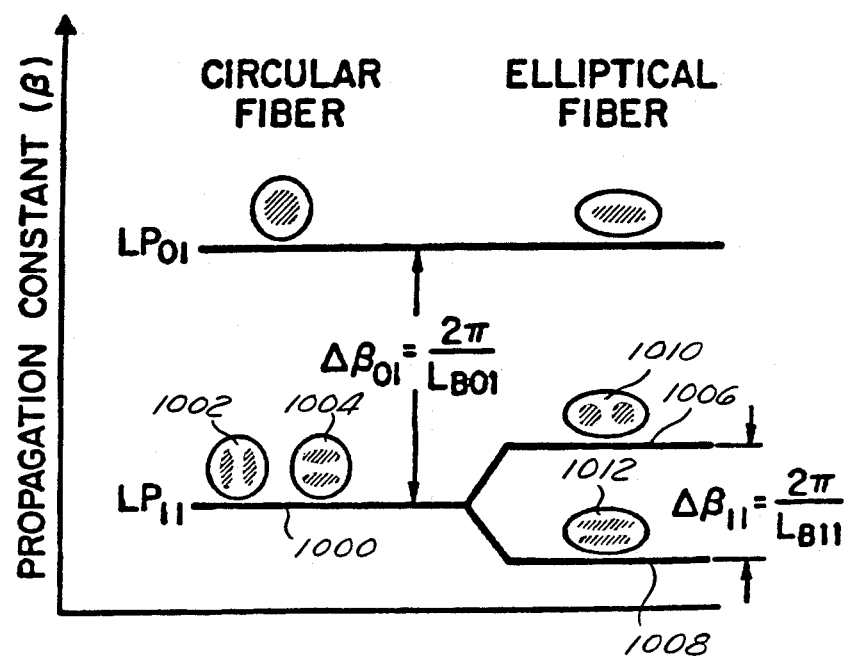
FIG. 23 is an illustration of the $LP_{11}$ mode degeneracy in circular core fiber showing the $LP_{01}$ and $LP_{11}$ modes plotted in terms of their relative propagation constants.

The degeneracy of the orthogonal lobe orientations of the $LP_{11}$ modes can be resolved by using a elliptical core fiber. FIG. 23 illustrates the $LP_{11}$ mode degeneracy in a circular core fiber where the $LP_{01}$ and $LP_{11}$ modes are plotted in terms of their relative propagation constants and the shape of the fiber core. As shown at location 1000, which represents the value of the propagation constant for the $LP_{11}$ modes in a circular fiber, two orthogonal lobe orientations, 1002 and 1004, exist for the $LP_{11}$ propagation mode. It can be shown that the $LP_{11}$ lobes will follow the shape of an elliptical core fiber, thus resolving this degeneracy. This effect is illustrated by the two unequal propagation constant values, shown at locations 1006 and 1008 in FIG. 23, for the $LP_{11}$ modes which exist in an elliptical core fiber. The orthogonal orientation of the two non-degenerate $LP_{11}$ modes in the elliptical core fiber which were degenerate in the circular core fiber, are shown as 1010 and 1012. Therefore, use of an elliptical core fiber is seen to provide orientational control over the $LP_{11}$ propagation modes.

Since the alignment of the $LP_{11}$ lobe orientation can be controlled with elliptical fiber, the mode selector 640 in FIG. 9, when constructed with an elliptical fiber, can preferentially select either of the non-degenerate $LP_{11}$ modes. Alignment accuracy is not critical, since the only disadvantage of a misaligned fiber is loss of optical signal by the factor $\cos^2 \Delta\phi$, where A is the angular alignment error.

Empirical verification of the above described lobe orientations in the $LP_{11}$ modes in circular and elliptical core fiber was obtained using the frequency shifter shown in FIG. 9. In the experimental setup, an $LP_{11}$ mode selector was not used in the frequency shifter, so the output signal from the acoustic interaction region was the end of the fiber 602 in FIG. 9.

Figure 24:
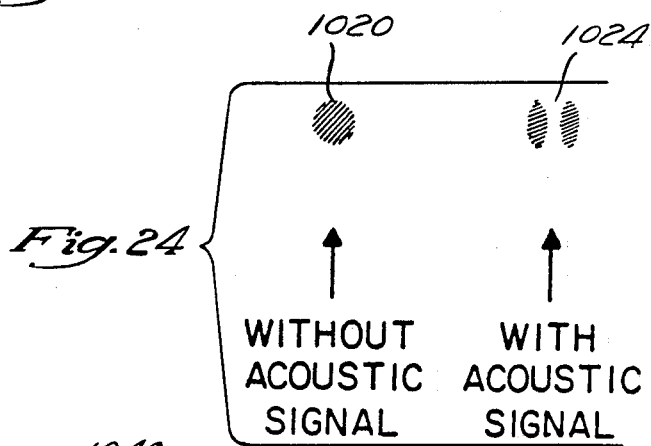
FIG. 24 illustrates two far-field radiation patterns from the end of a double-mode fiber.

FIG. 24 illustrates the far-field radiation pattern from the end of the double-mode fiber 602 with an acoustic signal applied to the fiber shown at 1024 and without an acoustic signal applied shown at 1020. A complete coupling from the $LP_{01}$ mode shown at 1020 to the $LP_{11}$ mode shown at 1024 is seen with an input electrical signal of 100 mW at about 8 MHz applied to the PZT. Overcoupling was observed when the acoustic power was increased further.

Figure 25:
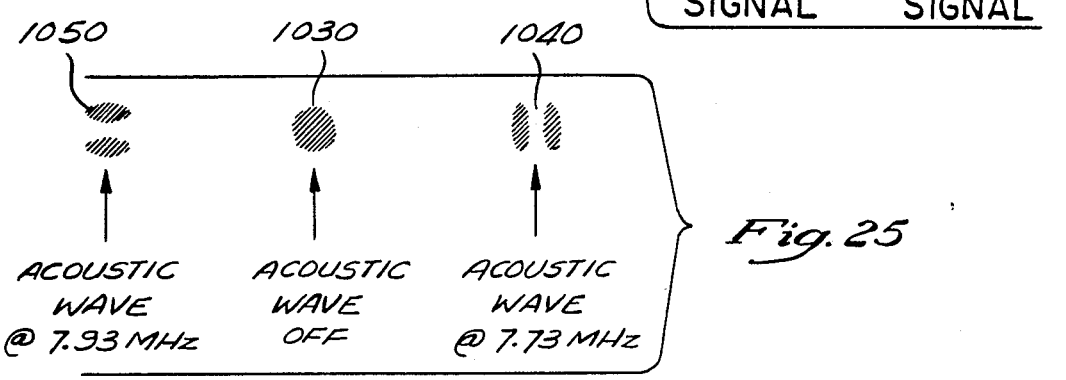
FIG. 25 illustrates three far-field radiation patterns of light from an elliptical core fiber.

The three far-field radiation patterns shown in FIG. 25 demonstrate that ellipticity in the shape of the core of the double-mode fiber used for frequency shifting has a marked effect on the output signal from the device. The resolution of the two orthogonal lobe orientations of the $LP_{11}$ mode can also be observed by using the acousto-optic frequency shifter described previously to selectively couple light travelling in the $LP_{01}$ mode to either of the two $LP_{11}$ orthogonal lobe orientation modes. This is accomplished by using acoustic waves of slightly different frequencies for the coupling interaction. FIG. 25 shows the far-field radiation pattern from the output of a double-mode fiber with no acoustic signal, shown at 1030; with an acoustic signal of 7.73 MHz, shown at 1050; and with an acoustic signal of 7.93 MHz, shown at 1040 applied to the fiber. As clearly shown, nearly 100% coupling to each $LP_{11}$ mode orientation was accomplished with little or no coupling to the other $LP_{11}$ mode for the acoustic signal frequency satisfying the coupling conditions for that transition.

An Alternative Embodiment Utilizing Single-Mode Birefringent Fiber and Second Order Flexural Acoustic Waves The frequency shifter embodiments illustrated in FIGS. 8, 22a and 22b were described in terms of a first order flexural acoustic wave propagating in a multimode fiber. The first order flexural acoustic wave forms a series of traveling microbends in the fiber which cause the mode coupling described in reference to FIGS. 1–8.

In an alternative embodiment, frequency shifted polarization mode coupling occurs in a single-mode birefringent optical fiber as a result of the propagation of a second order flexural acoustic wave in the fiber. Generally, the second order flexural wave propagates in a manner which exerts a traveling squeezing force on the fiber and causes light to be coupled from one polarization mode to another.

Single-mode birefringent fiber supports two orthogonally polarized modes which are normally uncoupled. A spatially periodic stress pattern can induce coupling between these two modes, leading to power transfer from one mode to the other and vice versa. This power transfer will be cumulative if the spatial period of the stress pattern equals the beat length of the fiber. The beat length is defined as $L_B = \lambda A/(n_1 - n_2)$ where $\lambda A$ is the optical wavelength, and $n_1$ and $n_2$ are the refractive indices for the two polarization modes of the fiber. The stress pattern is most effective in causing coupling when applied at an angle of approximately 45° relative to the principle axes of birefringence of the fiber. A more complete description of polarization mode coupling is found in the R. C. Youngquist, et al. article entitled "Birefringent-Fiber Polarization Coupler", *Optics Letters*, Vol. 8, No. 12, pp. 656–658, December 1983, which is incorporated herein by reference.

If the periodic stress pattern is produced by a traveling acoustic wave, the frequency of the light coupled from one polarization mode to the other will be shifted by the frequency of the acoustic wave. Frequency shifted coupling requires that the acoustic wave be properly phase matched to the beat pattern of the optical modes in the fiber. Such phase matching occurs when the acousti wavelength measured along the length of the fiber is equal to the beat length $L_B$ for the polarization modes of the fiber. Stated differently, the phase matching condition is satisfied when $k_2 = k_1 + k_a$, where $k_1$ is the optical propagation constant for light propagating in the faster mode of the fiber (lower index of refraction), $k_2$ is the propagation constant of the slower mode of the fiber (higher index of refraction), and $k_a$ is the propagation constant of the acoustic wave propagating in the fiber. If the acoustic wave is traveling in the same direction as the light, light launched into the fast mode of the fiber at frequency $w$ will be coupled to the slow mode and upshifted in frequency to $\omega + \omega_a$ (upper sideband). Light launched into the slow mode at frequency $\omega$ will be coupled to the fast mode and downshifted in frequency to $\omega - \omega_a$ (lower sideband). If the direction of the acoustic wave is reversed, the upshifted wave appears in the fast mode and the downshifted wave in the slow mode. A more detailed description of this frequency shifting process may be found in copending U.S. patent application Ser. No. 581,176, "Acousto-Optic Frequency Shifter", filed Feb. 17, 1984, assigned to the assignee of the present application and incorporated herein by reference. The devices reported in this copending application demonstrated this principle utilizing surface acoustic waves and bulk acoustic waves propagating in a medium external to the fiber but in acoustic contact with the fiber.

Two preferred embodiments of the present invention, illustrated in FIGS. 26a and 26b, utilize second order flexural acoustic waves to cause frequency shifting in a birefringent fiber. In both embodiments, the acoustic wave is confined to propagate in the fiber. In one embodiment, shown in FIG. 26a, the second order flexural wave is generated by two acoustic horns, 1102 and 1104, attached to the birefringent fiber 1106 at locations 1108 and 1110, respectively. Piezoelectric transducers (PZT) 1103, 1105 are attached to the ends of the acoustic horns 1102 and 1104, respectively. A signal generator 1107 is connected to the PZT transducers 1103, 1105. Alternatively, the second order flexural acoustic wave can be generated by two stacks of piezoelectric transducers (PZT) 1112, 1114, attached to the fiber at locations 1108 and 1110, respectively, as shown in FIG. 26b.

In both of these embodiments, light is coupled between polarization modes of the fiber and shifted in frequency by a traveling periodic perturbation of the fiber birefringence as described in the above cited copending U.S. patent application Ser. No. 581,176. However, the traveling periodic stress pattern in the present invention is provided by an acoustic wave which propagates in the fiber. Preferably, the acoustic wave comprises the lowest mode of the n=2 group of flexural acoustic waves. This mode has a spatial displacement variation similar to the spatial displacement generated in a fiber by a traveling periodic lateral squeezing force. The squeezing spatial displacement of this wave mode is an inherent characteristic of second order flexural waves propagating in rod-shaped media.

FIG. 27, which is a cross-sectional projection along lines A—A in FIG. 26a, illustrates one method of generating second order flexural waves in a fiber. In this embodiment, two acoustic horns 1102, 1104 are located on opposite sides of the fiber 1106 at locations 1108 and 1110, respectively. Piezoelectric transducers 1103, 1105 cause longitudinal acoustic waves to be generated at the ends 1108, 1110 of the acoustic horns 1102, 1104. The longitudinal waves produced at the ends of the acoustic horns apply a lateral force along the diameter of the fiber in the direction of the arrows 1116, 1118. As illustrated, these forces 1116, 1118 are applied at an angle with respect to the axes of birefringence (X, Y) of the fiber 1106. Preferably, the forces represented by arrows 1116, 1118 are of equal amplitude but opposite direction and at an angle of substantially 45° with respect to axes of birefringence. These conditions can be achieved by driving the piezoelectric transducers 1103, 1105 attached to the acoustic horns with the same signal generator 1107. This ensures that the amplitudes of the forces 1116, 1118 are in phase and of approximately equal amplitude. Application of the lateral forces along the direction of the arrows 1116, 1118 causes the cross-sectional dimensions of the fiber 1106 to be distorted as represented by the fiber profile 1106'.

Figure 28:
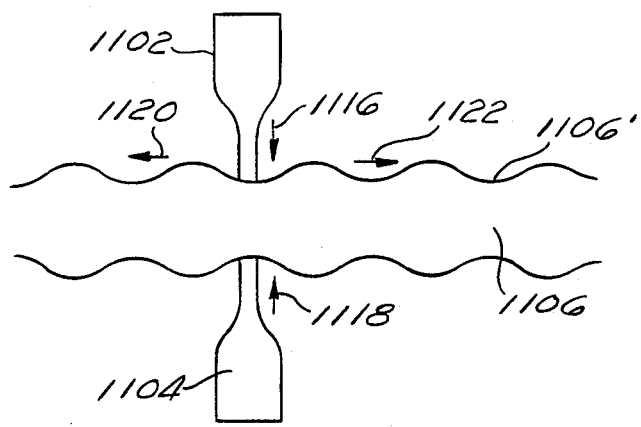
FIG. 28 is a pictorial representation illustrating the spatial displacements in a fiber created by propagation of a second order flexural wave along the length of the fiber.

FIG. 28 illustrates a side view of the fiber 1106, showing the propagation of the distorted profile 1106' generated by the acoustic horns and propagated within the fiber 1106 as second order flexural waves. The forces 1116, 1118 applied to the fiber spatially distort the fiber and generate the flexural acoustic waves which propagate within the fiber 1106 in opposite directions as represented by arrows 1120 and 1122.

The phase matching condition for coupling between modes is satisfied when the acoustic wavelength, as measured along the direction of the fiber equals the beat length, $L_B$, of the fiber. In a typical single-mode birefringent fiber, the beat length $L_B$ is approximately 2 mm, therefore, phase matching will occur when the wavelength of the second order flexural acoustic wave is also approximately 2 mm.

Figure 29:
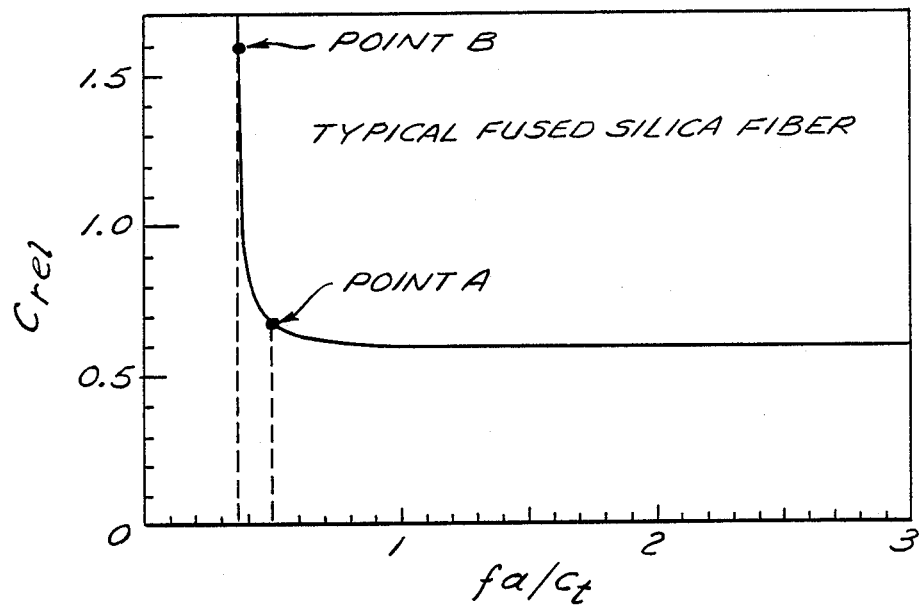
FIG. 29 is a graph of calculated phase velocity versus $fa/c_t$ for second order flexural waves propagating in a typical fused silica fiber.

The magnitude of the acousto-optic frequency shift generated by acoustic waves interacting with a fiber is equal to the frequency of the acoustic wave. The frequency of the acoustic wave is given by $f=c/\lambda$, where $\lambda$ is the wavelength and c is the phase velocity of the wave within the fiber. Generally, frequency shifters are designed to generate a specific frequency shift. The acoustic wavelength is required by the phase matching condition to be equal the beat length of the fiber. Selection of a specific acoustic frequency is, therefore, dependent upon the control and selection of the phase velocity in accordance with this relationship. FIGS. 17a–17d, discussed in detail earlier, illustrate the dependence of the normalized phase velocity of the acoustic wave $c_{rel}$ as a function of $fa/c_t$ for the five lowest modes of the second order group of flexural waves. It will be recalled from the discussion concerning FIG. 17 that the normalized phase velocity $c_{rel}$ is defined as $c/c_{ext}$, f is the acoustic frequency, a is the fiber radius and $c_t$ and $c_{ext}$ are constants characteristic of the propagation medium. FIG. 29 is a similar curve illustrating the lowest propagation mode of a second order flexural wave propagating in a typical fused silica fiber. Using this curve, typical fiber diameters corresponding to specific acoustic frequencies of an acoustic wave having a wavelength of 2 mm can be calculated. The following table summarizes the fiber diameters meeting these criteria for three representative frequencies calculated for two different values of the parameter $fa/c_t$:

| $fa/c_t$ | $L_B$(mm) | f(MHz) | a(mm) |
|---|---|---|---|
| 0.5 | 2 | 2 | 0.94 |
| 0.5 | 2 | 5 | 0.38 |
| 0.5 | 2 | 10 | 0.19 |
| 0.35 | 2 | 2 | 0.66 |
| 0.35 | 2 | 5 | 0.26 |
| 0.35 | 2 | 10 | 0.13 |

The locations labeled A and B on the curve, correspond to values of $fa/c_t$ approximately equal to 0.5 and 0.35, respectively. The numbers in this table illustrate that the frequency shifter of the present invention, utilizing a single-mode birefringent fiber with a beat length of 2 mm, will shift the frequency of light coupled between polarization modes by 2 MHz, 5 MHz and 10 MHz when the radius of the fiber is 0.94 mm, 0.38 mm and 0.19 mm, respectively, when $fa/c_t$ is selected to be 0.5. The same frequency shifts, i.e., 2 MHz, 5 MHz and 10 MHz may also be produced with fiber having radii of 0.66 mm, 0.26 mm and 0.13 mm, respectively, when the value of $fa/c_t$ is chosen to be 0.35.

The bandwidth of the subject frequency shifter can be defined as the range of frequencies within which frequency shifting occurs. Outside of this range of frequencies, substantially no frequency shifted coupling takes place. The bandwidth of the subject invention operating at a specific location along the curve in FIG. 29, can be shown to be proportional to the slope of the curve at that specific location. Since the slope at point A is readily seen to be substantially smaller than the slope at point B, it follows that the bandwidth of the device using fiber radii and frequencies corresponding to point A will be substantially larger than the bandwidth for a similar device using fiber radii and frequencies corresponding to point B. For example, the bandwidth for a 10 MHz frequency shifter having a fiber radius of 0.19 mm (point A) will be substantially larger than the bandwidth for a 10 MHz frequency shifter having a fiber radius of 0.13 mm (point B). Bandwidths intermediate these two values occur at locations along the curve corresponding to $fa/c_t$ values intermediate those of point A and point B. Thus, it is seen that a desired bandwidth at a specific frequency can be selected by appropriate selection of the fiber radius.

The coupling efficiency of the present invention is a function of the amount of acoustic energy required to cause substantially all of the optical energy propagating in one polarization mode to be coupled to the other polarization mode. A low efficiency device requires more acoustic power input to effectuate the same amount of optical coupling than would a higher efficiency device.

Coupling between polarization modes occurs as a result of perturbing the birefringence of the fiber. Since the birefringence of the fiber is primarily determined by the characteristics of the fiber core, the coupling efficiency is closely related to the amount of acoustic energy concentrated in the region of the core and available for perturbation of the core.

At low frequencies, the wave energy of flexural waves is distributed over the cross-section of the fiber. Since the core is located at or near the center of the fiber, it is primarily affected by the portion of wave energy propagating at or near the core of the fiber. As the frequency of the flexural wave increases, the wave energy becomes increasingly concentrated near the surface of the fiber. For very high frequencies, the flexural wave propagates with nearly all of its energy concentrated within a few wavelengths of the fiber surface. Obviously, these surface displacements will not place much stress on the core of the fiber and thus will have a minimal effect on coupling generated by perturbation of the fiber core. Thus, the efficiency of the coupling is seen to be dependent upon the frequency of the flexural wave, lower frequency waves being more effective in perturbing the fiber core than are higher frequency waves.

Relative coupling efficiency is also dependent on the relative diameters of the fibers. The diameter of a fiber does not necessarily affect its beat length, since the beat length is a characteristic determined primarily by the core. Therefore, the difference between two fibers having the same beat length but different outer diameters is primarily in the thickness of the cladding surrounding the core. For maximum perturbation of the core caused by squeezing the fiber, it is preferable to use the smaller diameter fiber, since the acoustic squeezing energy per unit area of fiber will be greater in smaller fiber for the same acoustic input energy simply by virtue of the geometrics of the fiber. For example, the energy per unit area in a fiber having a radius of 0.94 mm is about half as large as the energy density in a fiber with a radius of 0.66 mm. Assuming the same input energy, the core of the smaller fiber will be perturbed to a greater extent than will the core of the larger fiber, and thus, the smaller fiber will provide a higher coupling efficiency.

While preferred embodiments of this invention have been disclosed herein, those skilled in the art will appreciate that changes and modifications may be made therein without departing from the spirit and the scope of this invention as defined in the appended claims.

We claim:

1. An apparatus for coupling light between optical propagation modes in an optical fiber, comprising:
   an optical fiber having a first optical propagation mode and a second optical propagation mode for light propagating therein; and
   a generator, connected to said fiber such that said generator produces a flexural wave which propagates in said optical fiber, the energy of said flexural wave confined to said optical fiber, said flexural wave having a frequency, a propagation velocity and a wavelength, said wavelength of said flexural wave being a function of said frequency and said propagation velocity, and being selected to cause coupling of light from one of said first an second modes to the other of said first and second modes.

2. The apparatus as defined in claim 1, wherein the propagation velocity of said flexural wave is dependent upon the cross sectional dimensions of said fiber and wherein said cross-sectional dimensions vary along said fiber to cause said propagation velocity to vary along the length of said fiber.

3. The apparatus as defined in claim 2, wherein said fiber is tapered in discrete steps.

4. The apparatus as defined in claim 2, wherein said fiber is tapered gradually.

5. The apparatus as defined in claim 2, wherein said generator includes means for varying the frequency of said flexural wave.

6. The apparatus as defined in claim 5, wherein the taper of said fiber is selected such that the region over which substantial coupling occurs is small compared to the length of said fiber, the location of said region varying along said fiber as the frequency of said flexural wave is varied.

7. The apparatus as defined in claim 6, wherein the length of said fiber is at least about an order of magnitude greater than said coupling region.

8. The apparatus as defined in claim 6, wherein the length of said coupling region is on the order of a few beat lengths.

9. The apparatus as defined in claim 2, wherein said optical fiber comprises at least first and second portions, said first portion having a larger outer diameter than said second portion, said flexural wave in said first portion having a wavelength determined by a first frequency and a first propagation velocity, said second portion size to cause a flexural wave at a seCon frequency and at a second propagation velocity to have the same wavelength.

10. The apparatus as defined in claim 9, wherein the length of said first portion is selected to provide substantially complete coupling of light from one of said first and second propagation modes to the other of said first and second propagation modes at a first frequency of said flexural wave and the length of said second portion is selected to provide substantially complete coupling of light from one of said first and second propagation modes to the other of said first and second propagation modes at a second frequency of said flexural wave.

11. The apparatus as defined in claim 9, wherein:
    said fiber includes a third portion having a diameter larger than the diameter of said first and second portions of said optical fiber; and
    said diameter of said third portion being sized so that virtually no coupling between said first and second optical propagation modes occurs in said third portion of the fiber.

12. The apparatus as defined in claim 11, wherein said generator of said flexural wave is coupled to said optical fiber at said third portion of said optical fiber.

13. The apparatus as defined in claim 2, wherein said optical fiber comprises at least first and second portions, said first portion having a larger outer diameter than said second portion, said flexural wave having a first propagation velocity and a corresponding first flexural wavelength in said first portion and having a second propagation velocity and a corresponding second flexural wavelength in said second portion, said first flexural wavelength substantially equal to a first fiber beat length for light at a first optical frequency and said second flexural wavelength substantially equal to a second fiber beat length for light at a second optical frequency.

14. The apparatus as defined in claim 1, wherein said flexural wave comprises a mode of the first order group of flexural waves and forms a series of traveling microbends in said optical fiber.

15. The apparatus as defined in claim 14, wherein said optical fiber is a multimode optical fiber.

16. The apparatus as defined in claim 15, further including a mode selector comprising a second dissimilar optical fiber positioned in the evanescent field of said multimode optical fiber so that light propagating in said optical fiber in said second propagation mode is exclusively coupled to said second dissimilar optical fiber in a selected propagation mode of said second dissimilar optical fiber to thereby separate light propagating in said second propagation mode from light propagating in said first propagation mode.

17. The apparatus as defined in claim 15, wherein said multimode optical fiber comprises a core having a non-circular cross section.

18. The apparatus as defined in claim 17, wherein said fiber has a core of elliptical cross section, and wherein one of said modes includes two orthogonal lobe orientations, the degree of ellipticity of said core selected to cause said orthogonal lobe orientations to be non-degenerate.

19. The apparatus as defined in claim 1, wherein said flexural wave is a second order flexural wave which spatially displaces said fiber so as to apply a periodic lateral squeezing force to said fiber.

20. The apparatus as defined in claim 19, wherein said optical fiber is a birefringent single mode fiber having two orthogonal polarization modes.

21. The apparatus as defined in claim 20, wherein the orientation of said squeezing force is at an angle of substantially 45° with respect to the axes of birefringence of said fiber.

22. The apparatus as defined in claim 1, wherein the efficiency of said coupling between said propagation modes in said fiber is dependent upon the cross-sectional dimensions of said fiber.

23. The apparatus as defined in claim 1, wherein the range of frequencies in which coupling occurs is dependent upon the cross-sectional dimensions of the fiber.

24. The apparatus as defined in claim 1, wherein the range of frequencies in which coupling occurs is dependent upon the frequency of said flexural wave.

25. The apparatus as defined in claim 1, wherein said wavelength of said flexural wave is selected to be substantially equal to the beat length of said fiber for light propagating therein.

26. The apparatus as defined in claim 1, wherein said first and second propagation modes have first and second optical propagation constants, respectively, for light propagating therein, and said flexural wave has a propagation constant which is substantially equal to the difference between said first and second optical propagation constants, such that said light is cumulatively coupled from one mode to the other.

27. The apparatus as defined in claim 1, wherein light traveling in said first propagation mode at a first optical frequency and a first phase propagation velocity is coupled to said second propagation mode at a second optical frequency and a second propagation velocity so that said second frequency is a sideband of said first optical frequency.

28. The apparatus as defined in claim 27, wherein said second optical frequency is equal to said first optical frequency plus said frequency of said flexural wave when the light in said fiber propagates in the same direction as said flexural wave and said first phase propagation velocity is greater than said second phase propagation velocity, and said second optical frequency is equal to said first optical frequency minus said frequency of said flexural wave when the light in said fiber propagates in the same direction as said flexural wave and said first phase velocity is less than said second phase velocity.

29. The apparatus as defined in claim 1, wherein said generator of said flexural wave comprises an acoustic transducer.

30. The apparatus as defined in claim 29, wherein said acoustic transducer produces longitudinal acoustic waves.

31. The apparatus as defined in claim 29, wherein said acoustic transducer produces torsional acoustic waves.

32. The apparatus as defined in claim 29, wherein said acoustic transducer produces flexural acoustic waves.

33. The apparatus as defined in claim 29, wherein said acoustic transducer comprises an elongated member having a first end mechanically coupled to said optical fiber and having a second end disposed away from said first end, said second end having a transducer disposed thereon, said transducer responsive to an electrical signal applied thereto to generate an acoustic wave which propagates from said second end of said member to said first end of said member to thereby induce said flexural waves in said optical fiber.

34. The apparatus as defined in claim 33, wherein said second end of said member is larger than said first end of said member so that the acoustic energy per unit area applied to said optical fiber is greater than the acoustic energy per unit area excited in said second end of said member by said transducer.

35. The apparatus as defined in claim 34, wherein said acoustic wave has a wavelength and said first end of said member has a cross-sectional dimension smaller than the wavelength of said acoustic wave.

36. The apparatus as defined in claim 34, wherein said transducer excites longitudinal mode acoustic waves in said member.

37. The apparatus as defined in claim 34, wherein said transducer excites surface acoustic waves at said second end, said member converting the energy of said surface waves to provide longitudinal waves at said first end of said member.

38. The apparatus as defined in claim 37, wherein said member comprises a cylinder which is hollow at said second end and is solid at said first end, the transition between said hollow end and said solid end being a smooth and gradual taper.

39. The apparatus as defined in claim 1, additionally comprising a damper, mechanically coupled to said optical fiber, to prevent reflection of said flexural wave traveling in said optical fiber.

40. The apparatus as defined in claim 1, wherein said optical fiber includes a portion in which the diameter of the cladding of said optical fiber decreases from a larger diameter to a smaller diameter, said generator coupled to said fiber at a location thereon at which the cladding diameter is sufficiently large to prevent coupling of light at said location.

41. The apparatus as defined in claim 1, wherein said coupling of light from one of said first and second modes to the other of said first an second moes occurs over a broad range of frequencies of said light propagating in said fiber.

42. An apparatus for coupling light, comprising:
an optical fiber having two propagation modes; and
an acoustic horn, acoustically coupled to said optical fiber and an acoustic transducer for generating surface acoustic waves on a surface of said horn, said horn configured to adiabatically transform said surface waves into longitudinal waves for exciting a flexural wave in said fiber to cause coupling of light between said modes.

43. The apparatus defined in claim 42 further comprising means for suppressing propagation of bulk acoustic waves in said horn.

44. An apparatus for coupling light between optical propagation modes in an optical fiber, comprising:
an optical fiber having a first optical propagation mode and a second optical propagation mode for light propagating therein, the cross-sectional dimensions of said fiber varying along the length of said fiber; and
a generator for producing an acoustic wave which propagates in said optical fiber, the energy of said traveling acoustic wave confined to said optical fiber, said acoustic wave having an acoustic frequency, said acoustic wave having a propagation velocity which varies with said varying cross-sectional imensions of said fiber and having a wavelength determined by said acoustic frequency and said propagation velocity, said wavelength of said acoustic wave selected to cause light to be coupled from one of said modes to the other of said modes.

45. An apparatus as defined by claim 44, wherein said cross-section of said fiber is gradually tapered.

46. An apparatus as defined by claim 45, wherein said cross-section of said fiber varies in discrete increments.

47. An apparatus for transforming low amplitude acoustic oscillations into high amplitude acoustic oscillations, comprising:
an acoustic medium having first and second ends, the cross-sectional area of said first end larger than the cross-sectional area of said second end; and
a transducer for producing surface acoustic waves in said first end which propagate to said second end, said medium having a transition region between said first and second ends, said transition region configured to substantially adiabatically transform said surface acoustic waves into longitudinal acoustic waves as said waves propagate from said first end to said second end.

48. The apparatus as defined in claim 47, wherein said medium further includes a cavity in said transition region for suppressing propagation of bulk acoustic waves in said medium.

49. The apparatus defined in claim 48, wherein said cavity is filled with a material which attenuates acoustic waves to suppress surface wave propagation within said cavity.

50. The apparatus as defined in claim 47, wherein said transducer comprises a piezoelectric material isposed on said first end of said medium, said piezoelectric material responsive to an electrical signal applied thereto to generate said surface acoustic waves.

51. The apparatus defined in claim 47, wherein the acoustic medium forms an acoustic horn for concentrating acoustic energy such that the acoustic energy per unit area applied to said first end is smaller than the acoustic energy per unit area at said second end.

52. The apparatus as defined in claim 47, wherein said second end has a cross-sectional dimension which is approximately equal to, or less than, the wavelength of the longitudinal mode acoustic waves.

53. A method of transforming surface acoustic waves into longitudinal acoustic waves comprising the steps of:
inducing a surface acoustic wave in a cylinder, said cylinder having first and second end portions with a transition portion therebetween, said first end portion having a larger diameter than said second end portion;
propagating said surface acoustic waves from said first end portion in the direction of said second end portion;
utilizing said transition portion to substantially adiabatically transform said surface acoustic waves into longitudinal mode acoustic waves; and
utilizing said transition portion to concentrate the energy of said surface acoustic waves such that the dominant acoustic wave mode at said second end of said cylinder is a longitudinal acoustic wave, having oscillations of higher amplitude than said oscillations of said surface acoustic wave induced at said first end portion.

54. The method defined in claim 53, further comprising the step of suppressing propagation of bulk acoustic waves in said transition portion.

55. A method of coupling light between optical propagation modes in an optical fiber comprising the steps of:
inputting light into an optical fiber having first and second optical propagation modes for light propagating therein; and
propagating a flexural wave in said optical fiber, said flexural wave having a frequency, propagation velocity and wavelength, said wavelength determined by said frequency and said propagation velocity, said wavelength selected so that a portion of said light propagating in one of said first and second propagation modes is coupled to the other of said first and and second propagation modes.

56. A method of coupling light between optical propagation modes in an optical fiber as defined in claim 55, further comprising the step of selecting the cross-sectional dimensions of said optical fiber such that the propagation velocity of said flexural wave varies along the length of said optical fiber.

57. A method of coupling light between optical propagation modes in an optical fiber as defined in claim 55, wherein said propagation step further comprises generating a series of traveling microbends in the fiber which propagate as a flexural wave of the first order group.

58. A method of coupling light between optical propagation modes in an optical fiber as defined in claim 57, further comprising the step of selecting said optical fiber such that said first and second optical propagation modes comprise first and second spatial modes of a multimode fiber.

59. A method of coupling light between optical propagation modes in an optical fiber as defined in claim 55, wherein said propagating step further comprises applying a periodic lateral squeezing force to said fiber to generate a second order flexural wave in said fiber.

60. A method of coupling light between optical propagation modes in an optical fiber as defined in claim 59, further comprising the step of selecting said optical fiber such that said first and second optical propagation modes comprise first and second polarization modes of a single-mode birefringent fiber.

61. A method of coupling light between optical propagation modes in an optical fiber as defined in claim 60, further comprising the step of applying said periodic squeezing force to said fiber at an angle with respect to the axes of birefringence of said fiber, said angle being about 45°.

* * * * *

UNITED STATES PATENT AND TRADEMARK OFFICE
CERTIFICATE OF CORRECTION

PATENT NO. : 4,832,437

DATED : May 23, 1989

INVENTOR(S) : Byoung Y. Kim, et al.

It is certified that error appears in the above-identified patent and that said Letters Patent is hereby corrected as shown below:

In Column 3, at line 46, change "perates" to --operates--.

In Column 4, at line 20, change "an piezo-electric" to --a piezo-electric--.

In Column 5, at line 66, change "LP11" to --$LP_{11}$--.

In Column 7, at line 10, change "rspectively" to --respectively--.

In Column 9, at line 61, change "upontthe" to --upon the--.

In Column 12, at line 35, change "als" to --also--.

In Column 12, at line 38, change "34," to --344--.

In Column 13, at line 41, change "$\omega_s=\omega_{0\pm\omega a}$" to --$\omega_s=\omega_0\pm\omega_a$--.

In Column 14, at line 43, change "$k_0$" to --$k_{01}$--.

In Column 14, at line 65, change "(i.e., $\omega_{11=\omega 0-\omega a}$)" to --(i.e., $\omega_{11}=\omega_0-\omega_a$)--.

In Column 15, at line 35, change "(i e.," to --(i.e.,--.

In Column 15, at line 41, change "locatin" to --location--.

In Column 15, at line 42, change "illustraed" to --illustrated--.

In Column 16, at lines 25 and 26, change "$\frac{1}{2}\{\cos[(\omega_{0+\omega a})t-(k_{11}+k_a)Z]+\cos[(\omega_{0-\omega a})t-(k_{11}-k_a)Z]\}$" to --$\frac{1}{2}\{\cos[(\omega_0+\omega_a)t-(k_{11}+k_a)Z]+\cos[(\omega_0-\omega_a)t-(k_{11}-k_a)Z]\}$--.

UNITED STATES PATENT AND TRADEMARK OFFICE
CERTIFICATE OF CORRECTION

PATENT NO. : 4,832,437

DATED : May 23, 1989

INVENTOR(S) : Byoung Y. Kim, et al.

It is certified that error appears in the above-identified patent and that said Letters Patent is hereby corrected as shown below:

In Column 16, at lines 37 and 38, change "$\frac{1}{2}\{\cos[(\omega_{0-\omega a})t-(k_{01}-k_a)Z]+\cos[(\omega_{0+\omega-\omega a})t-(k_{01}+k_a)Z]\}$" to --$\frac{1}{2}\{\cos[(\omega_0-\omega_a)t-(k_{01}-k_a)Z]+\cos[(\omega_0+\omega_a)t-(k_{01}+k_a)Z]\}$--.

In Column 16, at lines 55 and 56, change "$\frac{1}{2}\{\cos[(\omega_{0+\omega a})t-(k_{11}-k_a)Z]+\cos[(\omega_{0-\omega a})t-(k_{11}+k_a)Z]\}$" to --$\frac{1}{2}\{\cos[(\omega_0+\omega_a)t-(k_{11}-k_a)Z]+\cos[(\omega_0-\omega_a)t-(k_{11}+k_a)Z]\}$--.

In Column 17, at lines 6 and 7, change "$\frac{1}{2}\{\cos(\omega_{0-\omega a})t-(k_{01}+k_a)Z]+\cos[(\omega_{0+\omega a})t-(k_{01}-k_a)Z]\}$" to --$\frac{1}{2}\{\cos(\omega_0-\omega_a)t-(k_{01}+k_a)Z]+\cos[(\omega_0+\omega_a)t-(k_{01}-k_a)Z]\}$--.

In Column 17, at line 44, change "modes The" to --modes. The--.

In Column 17, at line 54, insert a paragraph demarcation between "20 Mhz." and "The".

In Column 17, at line 64, change "wave Therefore" to --wave. Therefore--.

In Column 18, at line 16, change "beatlength" to --beat length--.

In Column 18, at line 27, change "microbend" to --microbends--.

In Column 18, at line 46, change "second end 502" to --first end 502--.

In Column 19, at line 59, change "traeling" to --traveling--.

In Column 20, at line 2, change "14" to --614--.

In Column 21, at line 8, change "roximate" to --proximate--.

UNITED STATES PATENT AND TRADEMARK OFFICE
CERTIFICATE OF CORRECTION

PATENT NO. : 4,832,437

DATED : May 23, 1989

INVENTOR(S) : Byoung Y. Kim, et al.

It is certified that error appears in the above-identified patent and that said Letters Patent is hereby corrected as shown below:

In Column 21, at line 25, change "Fig. 22a)" to --(Fig. 22a)--.

In Column 21, at line 42, change "622a" to --662a--.

In Column 21, at line 45, change "62b" to --662b--.

In Column 24, at line 49, change "aatio" to --ratio--.

In Column 25, at line 18, change "vaue" to --value--.

In Column 26, at line 31, insert a paragraph demarcation between "diameters." and "By reciprocity".

In Column 27, at line 44, change "In this displacement" to --In this case, all three displacement--.

In Column 28, at line 1, change "i e.," to --i.e.,--.

In Column 28, at line 11, change "ct" to --$c_t$--.

In Column 28, at line 58, change "excitatin" to --excitation--.

In Column 30, at line 22, change "(or $|u_\phi|$). for r=0" to --(or $|u_\phi|$) for r=0.--.

In Column 31, at line 25, change "$C_{ext}$=5760 $\mu$m/sec" to --$C_{ext}$=5760 m/sec--.

In Column 31, at line 40, change "$W^{-\frac{1}{2}}$" to --$W^{-\frac{1}{2}}$--.

In Column 32, at line 43, change "acousic" to --acoustic--.

UNITED STATES PATENT AND TRADEMARK OFFICE
CERTIFICATE OF CORRECTION

PATENT NO. : 4,832,437

DATED : May 23, 1989

INVENTOR(S) : Byoung Y. Kim, et al.

It is certified that error appears in the above-identified patent and that said Letters Patent is hereby corrected as shown below:

```
In Column 32, at line 45, change "location." to --location
     B.--.
In Column 32, at line 51, change "acousti" to --acoustic--.
In Column 32, at line 52, change "seond" to --second--.
In Column 32, at line 53, change "acoust-optic" to
     --acousto-optic--.
In Column 32, at line 54, change "shwn" to --shown--.
In Column 32, at line 56, change "portons" to --portions--.
In Column 32, at line 57, change "couplin" to
     --coupling.--.
In Column 32, at line 58, change "acousticwave" to
     --acoustic wave--.
In Column 32, at line 59, change "th" to --the--.
In Column 32, at line 61, change "secon" to --second--.
In Column 32, at line 63, change "he" to --the--.
In Column 32, at line 65, change "whos" to --whose--.
In Column 32, at line 66, change "secod" to --second--.
In Column 32, at line 68, change "n" to --in--.
In Column 33, at line 4, change "frequenc" to
     --frequency,--.
In Column 33, at line 5, change "couplng" to
     --coupling--.
In Column 33, at line 7, change "optiized" to
     --optimized--.
```

UNITED STATES PATENT AND TRADEMARK OFFICE
CERTIFICATE OF CORRECTION

PATENT NO. : 4,832,437

DATED : May 23, 1989

INVENTOR(S) : Byoung Y. Kim et al

It is certified that error appears in the above-identified patent and that said Letters Patent is hereby corrected as shown below:

In Column 33, at line 8, change "Simlarly" to --Similarly--.

In Column 33, at line 10, change "shifer" to --shifter--.

In Column 33, at line 12, change "illustated" to --illustrated--.

In Column 33, at line 14, change "d1" to --$d_1$--.

In Column 33, at line 14, change "irst" to --first--.

In Column 33, at line 15, change "acustic" to --acoustic--.

In Column 33, at line 17, change "erlier" to --earlier--.

In Column 33, at line 18, change "acustic" to --acoustic--.

In Column 33, at line 19, change "complet" to --complete--.

In Column 33, at line 20, change "he" to --the--.

In Column 33, at line 21, change "crated" to --created--.

In Column 33, at line 28, change "$F_1$" to --$f_1$--.

In Column 33, at line 30, change "diaeter" to --diameter--.

In Column 34, at line 4, change "a elliptical" to --an elliptical--.

In Column 34, at line 31, change "A" to --$\Delta\phi$--.

In Column 35, at line 26, change "$\lambda A$" to --$\lambda$--.

In Column 35, at line 44, change "acousti" to --acoustic--.

In Column 36, at line 38, change "f.lexural" to --flexural--.

In Column 39, at line 20, change "an" to --and--.

UNITED STATES PATENT AND TRADEMARK OFFICE
CERTIFICATE OF CORRECTION

PATENT NO. : 4,832,437

DATED : May 23, 1989

INVENTOR(S) : Byoung Y. Kim et al

It is certified that error appears in the above-identified patent and that said Letters Patent is hereby corrected as shown below:

Col. 39, claim 9, at line 56, change "SeCon" to --second--.
Col. 42, claim 41, at line 24, change "an" to --and--.
Col. 42, claim 41, at line 24, change "moes" to --modes--.
Col. 43, claim 44, at line 52, change "imensions" to --dimensions--.
Col. 44, claim 50, at line 17, change "isposed" to --disposed--.
Col. 44, claim 55, at line 17, change "and and" to --and--.

Signed and Sealed this

Fifth Day of May, 1992

Attest:

DOUGLAS B. COMER

Attesting Officer

Acting Commissioner of Patents and Trademarks